United States Patent
Bhorkar et al.

(10) Patent No.: US 10,798,687 B2
(45) Date of Patent: Oct. 6, 2020

(54) SCHEDULING UPLINK TRANSMISSION OUTSIDE OF A TRANSMISSION OPPORTUNITY

(71) Applicant: Intel IP Corporation, Santa Clara, CA (US)

(72) Inventors: Abhijeet Bhorkar, Fremont, CA (US); Huaning Niu, San Jose, CA (US); Qiaoyang Ye, Fremont, CA (US); Jeongho Jeon, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 29 days.

(21) Appl. No.: 16/078,291

(22) PCT Filed: Sep. 30, 2016

(86) PCT No.: PCT/US2016/054622
§ 371 (c)(1),
(2) Date: Aug. 21, 2018

(87) PCT Pub. No.: WO2017/160343
PCT Pub. Date: Sep. 21, 2017

(65) Prior Publication Data
US 2019/0053222 A1    Feb. 14, 2019

Related U.S. Application Data

(60) Provisional application No. 62/308,468, filed on Mar. 15, 2016.

(51) Int. Cl.
*H04W 72/04* (2009.01)
*H04W 72/12* (2009.01)
(Continued)

(52) U.S. Cl.
CPC ....... *H04W 72/0413* (2013.01); *H04W 16/14* (2013.01); *H04W 72/1284* (2013.01);
(Continued)

(58) Field of Classification Search
None
See application file for complete search history.

(56) References Cited

U.S. PATENT DOCUMENTS

| 9,088,958 B2 | 7/2015 | Gummadi et al. |
| 2009/0046667 A1* | 2/2009 | Pelletier ............. H04W 52/286 370/335 |

(Continued)

FOREIGN PATENT DOCUMENTS

| WO | 2012/106843 A1 | 8/2012 |
| WO | 2013/022261 A9 | 2/2013 |
| WO | 2015034945 A1 | 3/2015 |

OTHER PUBLICATIONS

International Search Report dated Jan. 12, 2017 for International Application PCT/US2016/054622.

*Primary Examiner* — Brandon M Renner
(74) *Attorney, Agent, or Firm* — Schwabe, Williamson & Wyatt, P.C.

(57) ABSTRACT

A network device (e.g., an evolved Node B (eNB), user equipment (UE) or the like) can operate to enable scheduling UL transmissions on transmission opportunities outside of the UL grants or for multi-carrier UL scheduling. A communication component of the device can operate to process or generate communications on an unlicensed band or a licensed band in response to UL grants and indications provided via a DL transmission for scheduling. An eNB can provide indications to a UE for processing that indicate whether a transmission opportunity is on the same transmission opportunity as the UL grants or an external/outside transmission opportunity. The indications can further trigger an listen-before-talk (LBT) protocol, which can vary between a category 4 LBT or a single LBT interval that is shorter than the category 4 LBT, depending on the indication.

9 Claims, 13 Drawing Sheets

(51) Int. Cl.
*H04W 16/14* (2009.01)
*H04W 72/14* (2009.01)
*H04W 74/08* (2009.01)
*H04W 88/08* (2009.01)

(52) U.S. Cl.
CPC ....... *H04W 72/1289* (2013.01); *H04W 72/14* (2013.01); *H04W 74/0808* (2013.01); *H04W 88/08* (2013.01)

(56) References Cited

U.S. PATENT DOCUMENTS

| | | | |
|---|---|---|---|
| 2013/0083737 A1* | 4/2013 | Earnshaw | H04L 1/1887 370/329 |
| 2013/0083766 A1* | 4/2013 | Chung | H04W 72/0413 370/329 |
| 2014/0161014 A1 | 6/2014 | Sasaki | |
| 2015/0296385 A1 | 10/2015 | Zhang et al. | |
| 2016/0345206 A1* | 11/2016 | Yerramalli | H04W 72/042 |
| 2017/0094681 A1* | 3/2017 | Takeda | H04W 16/14 |
| 2017/0238334 A1* | 8/2017 | Yang | H04W 74/0816 370/336 |
| 2019/0069320 A1* | 2/2019 | Gao | H04W 72/14 |

* cited by examiner

SCHEDULING UPLINK TRANSMISSION OUTSIDE OF A TRANSMISSION OPPORTUNITY

REFERENCE TO RELATED APPLICATIONS

This application claims the benefit of U.S. Provisional Application No. 62/308,468 filed Mar. 15, 2016, entitled "OPERATION FOR SCHEDULED UL TRANSMISSION OUTSIDE TXOP WITH FIXED TIMING RELATIONSHIP BETWEEN PUSCH AND UL GRANT TRANSMISSION", the contents of which are herein incorporated by reference in their entirety.

FIELD

The present disclosure relates to wireless communications, and more specifically, to scheduling operations for uplink (UL) transmission outside of a transmission opportunity with a fixed timing relationship between the physical uplink shared channel (PUSCH) and the UL grant transmission.

BACKGROUND

Wireless mobile communication technology uses various standards and protocols to transmit data between a node (e.g., a transmission station) and a wireless device (e.g., a mobile device), or a user equipment (UE). Some wireless devices communicate using orthogonal frequency-division multiple access (OFDMA) in a downlink (DL) transmission and single carrier frequency division multiple access (SC-FDMA) in an uplink (UL) transmission, for example. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be an Evolved Universal Terrestrial Radio Access Network (E-UTRAN) Node B (also commonly denoted as evolved Node Bs, enhanced Node Bs, eNodeBs, or eNBs) as well as one or more Radio Network Controllers (RNCs), which communicate with the UE. The DL transmission can be a communication from the node (e.g., eNB) to the UE, and the UL transmission can be a communication from the wireless device to the node. In LTE, data can be transmitted from the eNodeB to the UE via a physical downlink shared channel (PDSCH). A physical UL control channel (PUCCH) can be used to acknowledge that data was received.

The explosive wireless traffic (data flow) growth across various network cells leads to an urgent need of rate improvement. With mature physical layer techniques, further improvement in the spectral efficiency will likely be marginal. On the other hand, the scarcity of licensed spectrum in low frequency band is resulting in a deficit in the data rate boost. Thus, interests are emerging in the operation of LTE systems in unlicensed spectrum. As a result, one major enhancement for LTE in 3GPP Release 13 has been to enable operation in the unlicensed spectrum via Licensed-Assisted Access (LAA), which expands the system bandwidth by utilizing the flexible carrier aggregation (CA) framework introduced by the LTE-Advanced system.

Enhanced operation of LTE systems in unlicensed spectrum is expected in future releases and 5G systems. Potential LTE operation in unlicensed spectrum includes, but is not limited to the LTE operation in the unlicensed spectrum via dual connectivity (DC) (referred to as DC based LAA) and the standalone LTE system in the unlicensed spectrum, in which LTE-based technology operates in unlicensed spectrum without utilizing an "anchor" in licensed spectrum. This combines the performance benefits of LTE technology with the simplicity of Wi-Fi-like deployments.

The unlicensed frequency band of interest in 3GPP is the 5 GHz band, which has wide spectrum with global common availability. The 5 GHz band in the US is governed by Unlicensed National Information Infrastructure (U-NII) rules by the Federal Communications Commission (FCC). The main incumbent system in the 5 GHz band is the Wireless Local Area Networks (WLAN), especially those based on the IEEE 802.11 a/n/ac technologies, for example. Because WLAN systems are widely deployed for carrier-grade access service and data offloading, sufficient care should be taken before the deployment, and why Listen-Before-Talk (LBT) is considered as a useful feature of Rel-13 LAA system for fair coexistence with the incumbent WLAN system. LBT is a procedure whereby radio transmitters first sense the communication medium and transmit only if the medium is sensed to be idle. Further, LBT is an important feature for co-existence in the unlicensed band, wherein a transmitter listens to detect potential interference on the channel, only transmitting in the absence of interfering signals above a given threshold. Furthermore, different regions such as Europe have regulations concerning LBT for operation in unlicensed bands. WiFi devices use carrier sense multiple access with collision avoidance (CSMA/CA) as an LBT scheme, for example.

DETAILED DESCRIPTION

Figure 1:
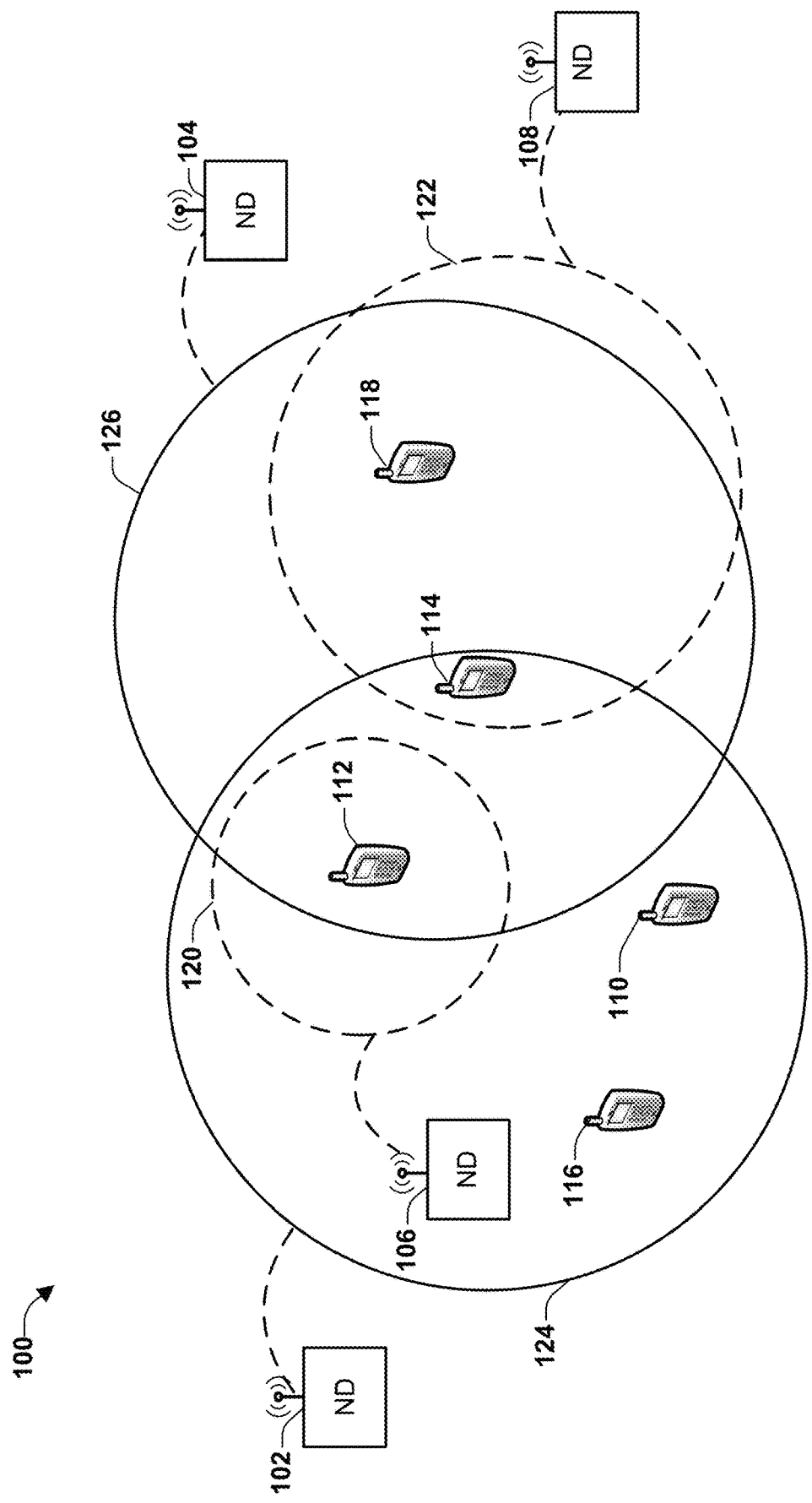
FIG. 1 illustrates a block diagram illustrating an example wireless communications network environment for a UE or eNB according to various aspects or embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, a circuit, circuitry or a circuit element, an object, an executable, a program, a storage device, a computer, a tablet PC and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components or elements without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

Overview

In consideration of the above described deficiencies, various components and techniques are disclosed that enable networks devices (e.g., eNBs) to schedule other network devices (e.g., UEs) with fixed or dynamic timing relationships between transmission grants (e.g., UL grants) and transmissions (e.g., UL transmissions), which include signaling operations, UL LBT operations, or extension of multi-carrier UL scheduling in unlicensed spectrums/bands or licensed spectrums/bands. An eNB, for example, can comprise a communication component that processes signals on an unlicensed/licensed band. A scheduling component of the network device can generate a DL transmission with one or more UL grants and one or more indications within a first transmission opportunity that can be transmitted to the UE and further enable scheduling one or more uplink (UL) transmissions associated with a PUSCH or a PUCCH, for example. These indications can specify to the UE whether to schedule the one or more UL transmissions within the first transmission opportunity or a second transmission opportunity that is outside of the first transmission opportunity. Therefore, the UE can then utilize the UL grants based on an indication to schedule UL transmissions outside of the first transmission opportunity and within a second transmission opportunity. At another time, the scheduling component can generate DL transmissions to the UE to schedule UL traffic within the same (first) transmission opportunity as the UL grants on a DL transmission instead of an external or different transmission opportunity. Likewise, the scheduling component can also generate another DL transmission to another UE, concurrently or simultaneously to the first DL transmission, with UL grants and an indication to schedule transmissions within the same first transmission opportunity as the DL transmission, and at another time within a second transmission opportunity, which is outside of the first transmission opportunity. Thus, one or more UEs communicatively coupled to an eNB via a wireless network can switch between using the same transmission opportunity or an external one depending upon the UL grants and the indications it receives.

A transmission opportunity (TxOP) can be referred to as a bounded time interval, as defined by a standard or a standards body (e.g., 3GPP, or other). During this time interval, a network device (e.g., an eNB) can communicate or transmit as many frames or subframes as possible as long as the duration of the transmission does not extend beyond a maximum duration of the TxOP or a maximum channel occupancy time (MCOT), for example.

In an aspect, a UE operating on an unlicensed/licensed spectrum can generate a listen before talk (LBT) protocol (e.g., a category 4 LBT or a clear channel assessment with a single LBT interval) and switch between different types of LBT protocols based on the indications of a DL transmission. The DL transmission, for example, can include LBT parameters, the UL grants and the type of LBT for the UE to perform before a UL transmission. As such, the UE can receive the DL transmission from the eNB, process and schedule UL transmissions based on the received UL grants and indications from the DL transmission. The UE can perform an LBT by sensing the unlicensed/licensed medium before the PUSCH or PUCCH, for example. When the unlicensed/licensed medium is determined to be idle, the UE can then transmit a PUSCH or PUCCH transmission during the PUSCH/PUCCH schedule based on UL grants and indications within a first transmission opportunity of the DL transmission. When the unlicensed/licensed medium is determined to be busy, the UE can prevent the PUSCH/

PUCCH transmission during the PUSCH/PUCCH schedule. The UE can then generate transmissions and the eNB can further receive the uplink PUSCH/PUCCH transmission from the UE based on the indications it provided to the UE in the DL transmission.

According to standard agreements (e.g., 3GPP Release-13 LAA or other agreement), a DL burst transmission is preceded by a category 4 LBT, which includes a clear channel assessment and an exponential random backoff procedure at the eNB. 3GPP Release-13 LAA design restricts the maximum channel occupancy time (MCOT) or the transmission opportunity (TxOP) after completion of LBT at the eNB to be 8 ms (if LAA co-exists with WiFi) or 10 ms (otherwise). An MCOT or TxOP is expected to include the DL subframe(s) from the eNB and the UL transmissions from UEs associated with the corresponding eNB. However, UL performance in unlicensed spectrum can be significantly degraded, essentially starving out or preventing UL transmissions within the same TxOp. The main cause of this UL starvation is due to the double LBT requirements at both eNB when sending the UL grant and at the scheduled UEs before transmission, whereby complete or longer LBT processes (e.g., category 4 LBT protocols) are being conducted twice for the same TxOP, at least once completely by the eNB and once by the UE. This can be a problem when a scheduled system (e.g., LTE) coexists with a non-scheduled autonomous system (e.g., Wi-Fi). Additionally, another particular limitation imposed on LTE systems includes a 4-subframe processing delay that restrict the initial four subframes in a transmission burst from being configured to UL, as such the UL grants are unavailable for those subframes within the same transmission burst.

In another aspect, a cross-scheduling-TxOP UL scheduling between the eNB and UEs of a network can serve to address the UL starvation issue and increase UL transmission opportunities. By enabling the UL subframes in one transmission burst of a TxOP to be scheduled in the preceding transmission bursts TxOP, rather than the same TXOP, a greater efficiency for UL can be enabled as well without confinement to the various restrictions discussed above. To be more specific, the UL scheduling is currently limited within the same TxOP, which degrades UL performance due to the 4-subframe delay limitation. For example, if the TxOP is limited to 6 msec, thus at most two subframes could be configured for UL transmission due to the four subframe latency between UL grant and PUSCH transmission. The cross-TxOP scheduling can provide a solution to this issue by scheduling potential UL subframes in the preceding transmission bursts, and allow the UL transmission to start earlier within the current transmissions burst, as well as not be confined to the same TxOP for both UL and DL. Apart from the UL starvation issue, the cross-TxOP scheduling can be beneficial, especially in UL heavy traffic scenario where it can enable a more flexible DL/UL subframe configuration. Additional aspects and details of the disclosure are further described below with reference to figures.

FIG. 1 illustrates an example non-limiting wireless communications environment 100 that can enable cross-TxOP scheduling, in which one or more UL grants on a DL subframe can schedule UL subframes in another TxOP that is outside of the TxOP for the UL grants (e.g., a subsequent TxOP, a following TxOP, or a TxOP other than the DL subframes with UL grants). For example, a first TxOP can be utilized to generate a DL transmission with UL grants to the UE and further provide various indications for different processes related to scheduling UL transmissions in a different or second TxOP that is outside or external to the first TxOP. For example, the UE can be provided an explicit indication of which subframes are to be utilized for PUSCH transmission when scheduling is outside of a current TxOP (or the TxOP with the corresponding UL grants). Other indications can also be provided for in DL transmissions such as for the type of LBT operations and associated operations, as detailed further in reference to FIGS. 2-13.

Wireless communications environment 100 can include one or more cellular broadcast servers or macro cell network devices 102, 104 (e.g., base stations, eNBs, access points (APs) or the like) as well as one or more other network devices such as small cell network devices or APs (e.g., small eNBs, micro-eNBs, pico-eNBs, femto-eNBs, home eNBs (HeNBs), or Wi-Fi nodes) 106, 108 deployed within the wireless communications environment 100 and servicing one or more UE devices 110, 112, 114, 116, 118 for wireless communications. Each wireless communications network (e.g., cellular broadcast servers 102, 104 and small cell network devices 106, 108) can comprise one or more network devices (e.g., a set of network devices (NDs)) that operate in conjunction in order to process network traffic for the one or more wireless/mobile devices or UE devices 110, 112, 114, 116, or 118. For example, macro cell NDs 102, 104 can comprise a set of network devices that are cellular enabled network devices. In another example, the small cell network devices 106, 108 can include a set of network devices that operate with a smaller coverage zone than the macro cell network devices 102 and 102, for example, or control similar coverage zones as the macro cell devices. As one of ordinary skill in the art can appreciate, this disclosure is not limited to any one network environment architecture/deployment.

Although NDs 106 and 108 are described as small cell network devices, they can also be Wi-Fi enabled devices or wireless local area network (WLAN) devices, as well as macro cell network devices, small cell network devices, or some other type of ND operable as a base station, eNB, or secondary cell network device for example. Alternatively one or more of the macro cell NDs 102 and 104 could be small cell network devices or other NDs of a different radio access technology (RAT) that operate with different frequency carriers, for example.

As illustrated, each of the one or more Wi-Fi access points 106, 108, for example, can have a corresponding service area 120, 122. Additionally, each of the one or more cellular broadcast servers or macro cell NDs 102, 104 can have a corresponding service area 124, 126. However, it should be understood that the wireless communications environment 100 is not limited to this implementation. For example, any number of APs or NDs with respective service areas can be deployed within the wireless communications environment 100. Further, any number of cellular broadcast servers and respective service areas can be deployed within the wireless communications environment 100 as well.

Although only five UE devices 110, 112, 114, 116, 118 are illustrated, any number of UE devices can be deployed within the wireless communications environment 100 as well. A UE device can contain some or all of the functionality of a system, subscriber unit, subscriber station, mobile station, mobile, wireless terminal, network device, mobile device, remote station, remote terminal, access terminal, user terminal, terminal, wireless communication device, wireless communication apparatus, user agent, user device, or other ND, for example.

In an example scenario, UE devices 110, 112, 114, 116, 118 can be serviced by networks through one of the macro cell NDs 102, 104, or small cell NDs 106, 108. As a UE device moves within the wireless communications environment 100, the respective user equipment device could move in and out of the coverage area of the associated serving network. For example, as a user is sending/receiving communications through their respective UE device, the user might be walking, riding in a car, riding on a train, moving around a densely populated urban area (e.g., a large city), wherein the movement could cause the mobile device to be moved between various wireless communication networks. In such cases, it can be beneficial for the UE to route the network traffic (e.g., handoff) from a serving ND to a target ND in order to continue the communication (e.g., avoid dropped calls) or facilitate offloading for load distribution or other efficiency purposes, such as via LAA to unlicensed bands. However, providing UL grants from the eNB 102 to a UE 116 for scheduling UL transmissions as part of a traffic flow on an unlicensed/licensed channel within the same TxOP can currently degrade UL access, especially where a double LBT protocol occurs with a category 4 LBT protocol at both the eNB and the UE. In addition, degradation can be further enhanced with a four subframe restriction in a transmission burst where the UL grants are unavailable for those initial four subframes within the same transmission burst. By enabling UL transmission to be scheduled in an outside TxOP from UL grants of a different TxOP, the UL transmissions can be enabled earlier and more efficient.

In another aspect, cellular broadcast servers or macro cell NDs 102, 104 and small cell NDs 106, 108 can monitor their surrounding radio conditions (e.g., by employing respective measurement components). For example, each of the macro cell NDs 102, 104 and small cell NDs 106, 108 can determine network traffic load on its respective network by performing a network diagnostic process. As an example, during a network listen procedure, such as a listen before talk (LBT) protocol/procedure macro cell NDs 102, 104, small cell NDs 106, 108 or UE devices 110, 112, 114, 116, 118 can scan their radio environment to determine network performance statistics or network parameters (e.g., frequency, SNR, signal quality, QoS, QoE, load, congestion, signal rate, etc.). Various parameters associated with macro cell NDs 102, 104, small cell NDs 106, 108, or UE devices 110, 112, 114, 116, 118 can be detected during the network diagnostic or LBT procedure or measurements, such as, but not limited to, frequency bands, scrambling codes, common channel pilot power, bandwidth across respective networks, universal mobile telecommunications system terrestrial radio access receive signal strength indicator, as well as frequency carrier priorities for particular cell groups (e.g., a normal group or a reduced group) and so on. As referred to herein, a category 4 LBT protocol/procedure can be longer than a single interval LBT or just a clear channel assessment and further include a backoff operation or procedure. For example, the category 4 LBT protocol can further include a random backoff procedure (e.g., an exponential random backoff procedure) as opposed to a clear channel assessment alone that can comprise a single interval LBT (or short Cat 4 LBT) operation; whereby a puncturing of the first symbol of PUSCH transmission occurs as part of the channel assessment to determine a busy channel or an idle/available channel/band.

In one embodiment, the eNB 102 can enable cross-TxOP UL scheduling by scheduling potential UL subframes in a preceding transmission burst, and thus enable UL transmissions to begin earlier than otherwise within the transmission burst. For example, the eNB 102 can generate a DL transmission with one or more UL grants and one or more indications within a first TxOP that enables scheduling a UL transmission associated with a PUSCH or a PUCCH. An indication can include one or more bits or other indication. The indications can provide various different triggers or indicators to the UEs 110 or 116, such as whether to schedule the one or more UL transmissions within the first transmission opportunity or a second transmission opportunity that is outside of the first transmission opportunity. Other indications can be based on different signaling operations for TxOPs and UL grants that include various indications to various parameters of the TxOPs and LBT operations based on whether scheduling is indicated to be within the same TxOP as the UL grants or within a different TxOP. The indications can enable a UE to process the UL grants for scheduling based on different parameters and conditions. These indications can be signaled explicitly or implicitly. The indications can include a type of LBT to perform, one or more subframe timing relationships, an identification of subframes to schedule in a second TxOP that is outside of the TxOP with the UL grant(s), a duration/subframe range for scheduling in the outside TxOP, an offset or other indication(s) such as whether a reservation signal is permitted.

For example, one or more indications with a DL transmission burst can include a subframe range indicating in particular at which subframes the UE can schedule transmissions on a different TxOP. Alternatively or additionally, the indications can include a timing relationship between the one or more UL grants and the one or more UL transmissions to enable a scheduling of subframes corresponding to the one or more UL transmissions within the second transmission opportunity based on particular subframes, which may or may not be in a sequential range. Each of these indications, a subframe range or an explicit timing relationship between UL grants and UL transmission subframes can also serve as indications to the corresponding UE to schedule transmissions outside of the current TxOP and in another different (second) TxOP. Alternatively or additionally, an explicit indication can be signaled to the UE to schedule transmission via cross-TxOP scheduling in a different TxOP than the UL grants, such as via one or bits by L1 interface signaling.

In another embodiment, the timing relationship for scheduling UL transmissions can be indicated as one or more offsets, which can be associated with one or more different UEs. The offset(s) can enable a timing relationship in a scheduling of subframes between the one or more UL grants and the one or more UL transmissions from the different UEs within the second transmission opportunity. If multiple UEs are identified in the same TxOP, then each UE could have an associated offset by which to schedule UL transmission, which can be provided in the corresponding UL grant or associated identifier of the correlation in a DL subframe.

In another embodiment, the indications can include whether to utilize a reservation signal to reserve the unlicensed band or the licensed band when completing a category 4 LBT protocol before a scheduled subframe boundary. As such, when a UE completes a category 4 LBT in response to the one or more UL transmissions being scheduled outside of the TxOP with the UL grant(s) (within second different TxOP), the UE can provide a reservation signal/operation that reserves the licensed/unlicensed band if the eNB has been provided the indication to enable use of the reservation. The one or more indications for the reservation or otherwise, as discussed above, can be signaled to one or more UEs or UE devices 110, 112, 114, 116, 118 via an L1 signal of an L1 interface, for example.

Alternatively or additionally, the UE can be pre-configured, or in response to a reservation signal not being enabled, utilize a self-defer. With the self-defer, if a UE (e.g., 110) completes a category 4 L BT before a PUSCH transmission, for example, the UE 110 can perform a clear channel assessment check as a single interval LBT or short LBT than the category 4 before the UL transmission.

In other embodiments, an eNB 102 can schedule a UE 110 or 116 with a fixed time relationship between grants and transmission on different component carriers. Thus, the one or more indications and the UL grants on the DL transmission can enable the UL grant and the corresponding PUSCH transmission to occur on different component carriers.

Figure 2:
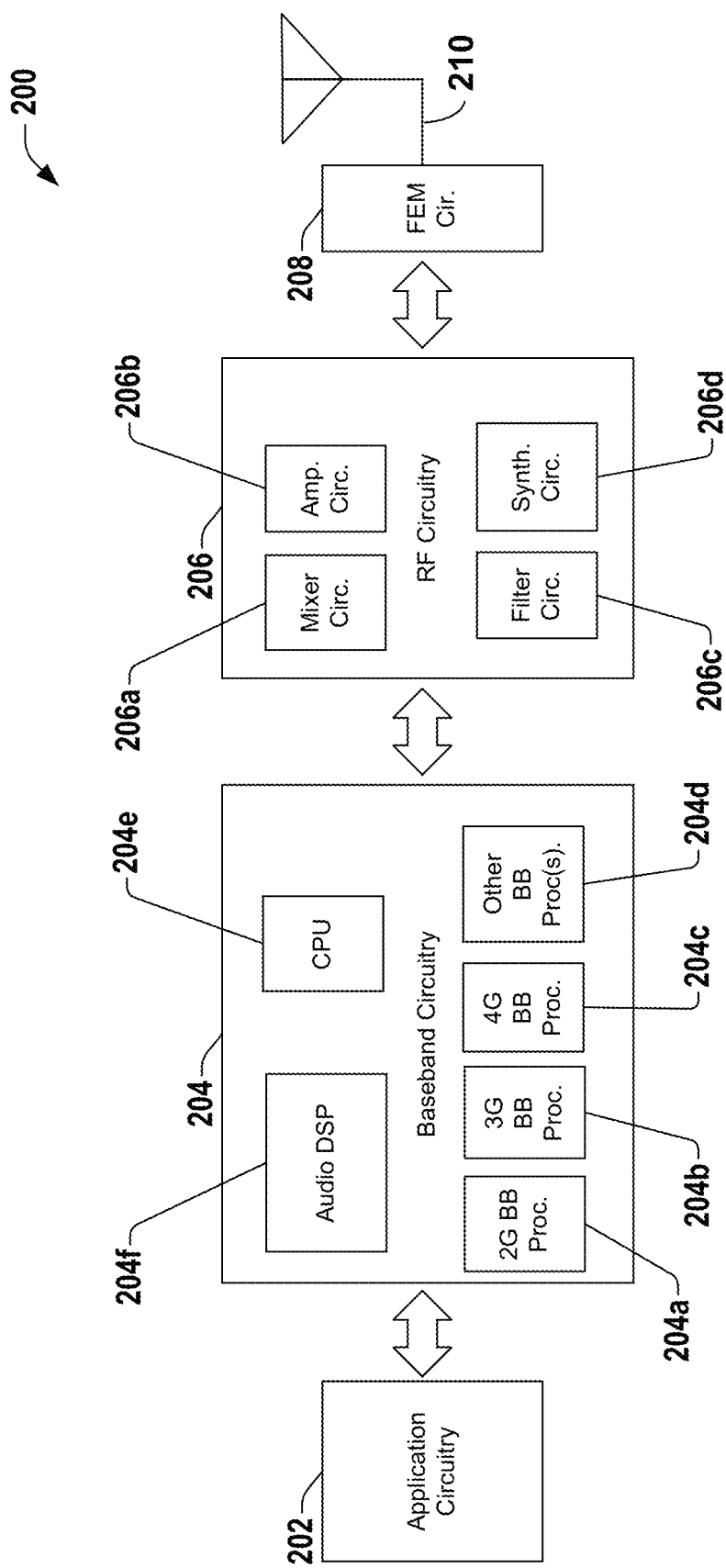
FIG. 2 illustrates example system or device for cross-TxOP scheduling operations according to various aspects or embodiments.

Embodiments described herein and further detailed in this disclosure can be implemented into an example system using any suitably configured hardware/software. FIG. 2 illustrates, for one or more embodiments, example components of a cell network device 200, such as a base station, a macro cell network device, a secondary cell network device, a small cell network device, an evolved/enhanced NodeB (eNB), or any other network device (e.g. a user equipment, pico cell, Femto cell or the like) that can be used on a wireless network to generate or process signaling for scheduling transmissions. In some embodiments, the cell network device 200 can include application circuitry 202, baseband circuitry 204, Radio Frequency (RF) circuitry 206, front-end module (FEM) circuitry 208 and one or more antennas 210, coupled together at least as shown.

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 204 can include circuitry such as, but not limited to, one or more single-core or multi-core processors. The baseband circuitry 204 can include one or more baseband processors and/or control logic to process baseband signals received from a receive signal path of the RF circuitry 206 and to generate baseband signals for a transmit signal path of the RF circuitry 206. Baseband processing circuity 204 can interface with the application circuitry 202 for generation and processing of the baseband signals and for controlling operations of the RF circuitry 206. For example, in some embodiments, the baseband circuitry 204 can include a second generation (2G) baseband processor 204*a*, third generation (3G) baseband processor 204*b*, fourth generation (4G) baseband processor 204*c*, and/or other baseband processor(s) 204*d* for other existing generations, generations in development or to be developed in the future (e.g., fifth generation (5G), 6G, etc.). The baseband circuitry 204 (e.g., one or more of baseband processors 204*a-d*) can handle various radio control functions that enable communication with one or more radio networks via the RF circuitry 206. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, and/or constellation mapping/demapping functionality. In some embodiments, encoding/decoding circuitry of the baseband circuitry 204 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204*e* of the baseband circuitry 204 can be configured to run elements of the protocol stack for signaling of the PHY, MAC, RLC, PDCP and/or RRC layers of an Open Systems Interconnection (OSI) model. In some embodiments, the baseband circuitry can include one or more audio digital signal processor(s) (DSP) 204*f*. The audio DSP(s) 204*f* can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with a EUTRAN and/or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the RF circuitry 206 can include a receive signal path and a transmit signal path. The receive signal path of the RF circuitry 206 can include mixer circuitry 206*a*, amplifier circuitry 206*b* and filter circuitry 206*c*. The transmit signal path of the RF circuitry 206 can include filter circuitry 206*c* and mixer circuitry 206*a*. RF circuitry 206 can also include synthesizer circuitry 206*d* for synthesizing a frequency for use by the mixer circuitry 206*a* of the receive signal path and the transmit signal path. In some embodiments, the mixer circuitry 206*a* of the receive signal path can be configured to down-convert RF signals received from the FEM circuitry 208 based on the synthesized frequency provided by synthesizer circuitry 206*d*. The amplifier circuitry 206*b* can be configured to amplify the down-converted signals and the filter circuitry 206*c* can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c. The filter circuitry 206c can include a low-pass filter (LPF), although the scope of the embodiments is not limited in this respect.

In some embodiments, the mixer circuitry 206a of the receive signal path and the mixer circuitry 206a of the transmit signal path can include two or more mixers and can be arranged for quadrature down-conversion or up-conversion respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct down-conversion or direct up-conversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+2 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+2 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+2 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210.

In some embodiments, the FEM circuitry 208 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210.

In some embodiments, the cell network device 200 can include additional elements such as, for example, memory/storage, display, camera, sensor, and/or input/output (I/O) interface. In some embodiments, the electronic device of FIG. 2 may be configured to perform one or more processes, techniques, and/or methods as described herein, or portions thereof.

In other embodiments, the network device 200 can operate to generate/process cross-TxOP signaling operations that involved transmission scheduling outside of a TxOP according to aspects described herein. Various parameters can be processed for these scheduling operations and used between communications on a network to enable more efficient and flexible scheduling. For example, indications can be provided as an explicit timing relationship between the UL grants of a DL transmission and UL transmissions across TxOPs, such as with an indicated range, identification of subframes (e.g., subframe indices or the like), particular offsets corresponding to subframes, one or more UEs that correspond to the indication(s) in the DL transmission of a TxOP, as well as whether cross-TxOP signaling is being indicated for a particular UE, type of LBT protocols, and various aspects related to single UE scheduling or multiple UE scheduling for cross-TxOP scheduling. Other indications can include similar operations corresponding to different component carriers for cross-carrier TxOP scheduling, which correspond to the operations or aspects related to cross-TxOP scheduling between different TxOPs of different carriers or bands.

Figure 3:
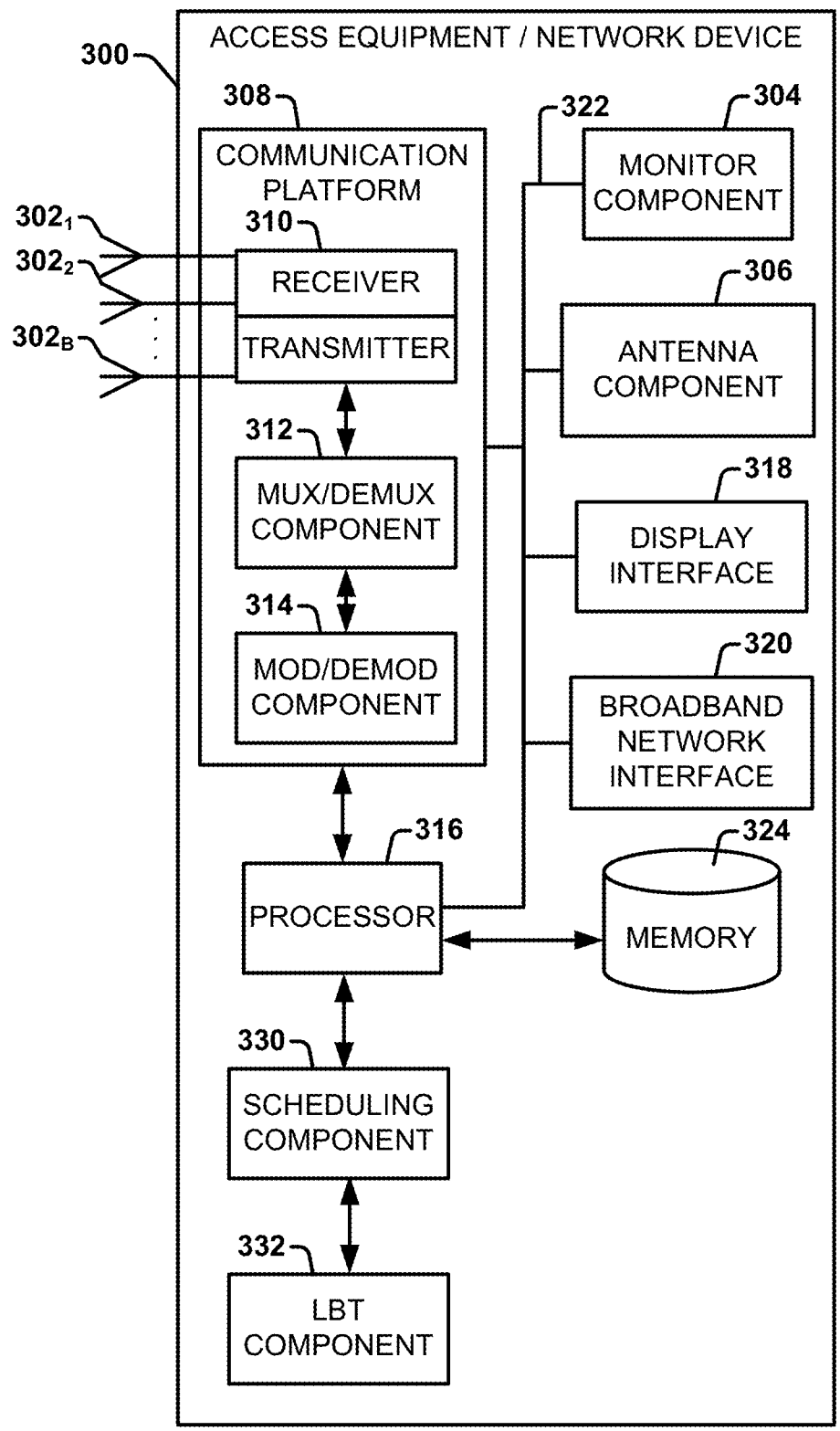
FIG. 3 illustrates an example network device for cross-TxOP scheduling operations according to various aspects or embodiments.

FIG. 3 further illustrates an embodiment of a network device or system 300 to be employed in an eNB, a UE or other network device that facilitates or enables signaling mechanisms to process or provide cross-Tx OP signaling, in which one or more UL grants transmitted within a TxOP can schedule UL transmissions for a different TxOP. System or device 300 can include the baseband circuitry component 204, the radio frequency (RF) circuitry component 206, or a front end module circuitry component 308 of FIG. 2, as well as communication component or platform 308 with transmitter circuitry component(s)/receiver circuitry component 310 (e.g., a communication component), a processor 316, memory 324, a scheduling component 330 and an LBT component 332.

In various aspects, device 300 can be included within an Evolved Universal Terrestrial Radio Access Network (E-UTRAN) Node B (Evolved Node B, eNodeB, or eNB 102), other base station, network access point, a secondary cell network device (e.g., a small cell, or WiFi network device) or other cell network component/device (e.g., UE 116 and 110) in a wireless communications network (e.g., network 124). Memory 324 also can include instructions that can be implemented by processor 316, transmitter circuitry 310, or receiver circuitry 310 to implement various aspects or embodiments described herein.

Memory 324 can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Access equipment (e.g., eNB, network entity, or the like), UE or software related to access of the network device 300 can receive and transmit signal(s) from and to wireless devices, wireless ports, wireless routers, etc. through segments $302_1$-$302_B$ (B is a positive integer). Segments $302_1$-$302_B$ can be internal and/or external to access equipment and/or software related to access of a network, and can be controlled by a monitor component 304 and an antenna component 306. Monitor component 304 and antenna component 306 can couple to communication component 308, which can include electronic components and associated circuitry that provide for processing and manipulation of received signal(s) and other signal(s) to be transmitted.

In an aspect, communication component 308 includes the receiver/transmitter 310 that can convert analog signals to digital signals upon reception of the analog signals, and can convert digital signals to analog signals upon transmission. In addition, receiver/transmitter 310 can divide a single data stream into multiple, parallel data streams, or perform the reciprocal operation. Coupled to receiver/transmitter 310 can be a multiplexer/demultiplexer 312 that can facilitate manipulation of signals in time and frequency space. Multiplexer/demultiplexer 312 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 312 can scramble and spread information (e.g., codes, according to substantially any code known in the art, such as Hadamard-Walsh codes, Baker codes, Kasami codes, polyphase codes, and so forth).

A modulator/demodulator 314 can also be a part of communication component/platform 308, and can modulate information according to multiple modulation techniques, such as frequency modulation, amplitude modulation (e.g., M-ary quadrature amplitude modulation, with M a positive integer); phase-shift keying; and so forth).

Access equipment or software related to access of a network also includes a processor 316 (or processor component) configured to confer, at least in part, functionality to substantially any electronic component in access equipment/software. In particular, processor 316 can facilitate configuration of access equipment and/or software through, for example, monitor component 304, antenna component 306, and one or more components therein. Additionally, access equipment and/or software can include display interface 318, which can display functions that control functionality of access equipment and/or software or reveal operation conditions thereof. In addition, display interface 318 can include a screen to convey information to an end user. In an aspect, display interface 318 can be a liquid crystal display, a plasma panel, a monolithic thin-film based electrochromic display, and so on. Moreover, display interface 318 can include a component (e.g., speaker) that facilitates communication of aural indicia, which can also be employed in connection with messages that convey operational instructions to an end user. Display interface 318 can also facilitate data entry (e.g., through a linked keypad or through touch gestures), which can cause access equipment and/or software to receive external commands (e.g., restart operation).

Broadband network interface 320 facilitates connection of access equipment or software to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 320 can be internal or external to access equipment and/or software and can utilize display interface 318 for end-user interaction and status information delivery.

Processor 316 can be functionally connected to communication platform 308 and can facilitate operations on data (e.g., symbols, bits, or chips) for multiplexing/demultiplexing, such as enabling direct and inverse fast Fourier transforms, selection of modulation rates, selection of data packet formats, inter-packet times, and so on. Moreover, processor 316 can be functionally connected, through data, system, or an address bus 322, to display interface 318 and broadband network interface 320, to confer, at least in part, functionality to each of such components.

In access equipment and/or software memory 324 can retain location and/or coverage area (e.g., macro sector, identifier(s)) access list(s) that authorize access to wireless coverage through access equipment and/or software sector intelligence that can include ranking of coverage areas in the wireless environment of access equipment and/or software, radio link quality and strength associated therewith, or the like. Memory 324 also can store data structures, code instructions and program modules, system or device information, code sequences for scrambling, spreading and pilot transmission, access point configuration, and so on. Processor 316 can be coupled (e.g., through a memory bus), to memory 324 in order to store and retrieve information used to operate and/or confer functionality to the components, platform, and interface that reside within access equipment and/or software.

The network device 300, system, component or device herein can be incorporated into or otherwise part of, an eNB, a UE, or some other type of electronic device in accordance with various embodiments. Specifically, the electronic device or components or interfaces described herein can be logic and/or circuitry that can be at least partially implemented in one or more of hardware, software, or firmware. In some embodiments, the electronic device logic can include radio transmit logic and receive logic (e.g., 310) coupled to control logic (e.g., processor 316). Additionally or alternatively, transmit/receive logic can comprise elements or modules of transceiver logic 310. The electronic device, component(s), circuitry or interfaces of such electronic device can be configured to perform operations similar to those described elsewhere in this disclosure.

In one embodiment, the processor 316, the communication platform/component 308, or the scheduling component 330 can generate or process cross-TxOP signaling operations within a wireless network. The communication component 330, for example, is configured to process communication signals on an unlicensed/unlicensed band to facilitate these signaling operations by generating, processing, receiving or transmitting one or more UL grants and indications for scheduling on 1) the same TxOP as a corresponding UL grant, or 2) on a different TxOP that is outside or external to the TxOP of the one or more UL grants.

In one example, when the one or more UL transmissions are being scheduled within the second transmission opportunity outside of the TxOP with the UL gran(s) and correspond to a single UE, the communication component 310 (e.g., via an L1 signal of an L1 interface) can generate or process an indication of whether to utilize a reservation signal to reserve the unlicensed band or the licensed band in response to or when completing a category 4 LBT protocol before a scheduled subframe boundary. As part of the category 4 LBT protocol a clear channel assessment with a random backoff operation can be conducted, which is longer in a duration or length than a single interval LBT. A backoff, for example, can include an increase with a random multiplier to a delay time when found that a data collision would occur on a given channel, such as when the channel or band under consideration is determined as busy, or not idle. The increase (e.g., a binary increase, an exponential increase, or otherwise) can increase the base time and random multiplier attempts to increase the likely gap between retries of competing nodes or other network devices, for example.

UEs scheduled within a same TxOP can be provided an indication or trigger to perform a single interval LBT (e.g., a short category 4 LBT with just a clear channel assessment) by puncturing a first symbol of PUSCH transmission. Likewise, when scheduled in another TxOP, the UEs can be provided an indication or a trigger to perform a category 4 LBT protocol that is longer in duration than the short single interval LBT, and further includes a clear channel assessment and a random backoff procedure. This indication can be provided as one or more bits explicitly or implicitly where given one or more conditions the LBT component 332 is triggered or pre-configured to know whether to implement a complete category 4 procedure or a singled interval LBT as only a clear channel assessment without a random backoff procedure.

For example, the LBT component 232 can perform a category 4 LBT protocol in response to the one or more indications of the DL transmission indicating to schedule the one or more UL transmissions within the second transmission opportunity. Alternatively or additionally, the LBT component 232 can further perform the category 4 LBT before transmission on a second TxOP and when multiple UEs are scheduled within one TxOP by one or more UL grants on another TxOP, such as a preceding one. Additionally or alternatively, the LBT component 232 can perform a clear channel assessment that is shorter than the category 4 LBT protocol in response to the one or more indications indicating to schedule the one or more UL transmissions within the first transmission opportunity on the unlicensed band or the licensed band, or in response to completing the category 4 LBT before a subframe boundary for the one or more UL transmissions on the second transmission opportunity and utilizing a self-deference interval. The self-deference interval can be a predefined time interval initiated by the LBT component 232 of a UE, for example, where a category 4 LBT is performed, but completes before the next TxOP or a subframe boundary. After such self-deference interval is performed, for example, a clear channel assessment can be performed at a first symbol before communicating the one or more UL transmissions after a second symbol of a subframe in response to performing the category 4 LBT protocol with the self-deference interval. A clear channel assessment alone can also be triggered by only one (or a single) UE being scheduled on a TxOP or being scheduled within the same TxOP as the one or more UL grants. After the clear channel assessment such as at a single LBT interval, the UE can communicate the one or more UL transmissions after a second symbol of a subframe, for example.

In another embodiment, the scheduling component 330 can generate cross-TxOP scheduling with a DL transmission that comprises one or more UL grants and associated scheduling indications within a first transmission opportunity. The UL grants and associated indications can be provided or generated within a DL subframe and operate to schedule multiple UL subframes by one or more UEs (e.g., UE devices 110, 112, 114, 116, 118) or just a single UE. The indications can be bits or data with explicit triggers as well as depend on signaling conditions, such as whether multiple UEs are scheduled in the UL grant or DL subframe for scheduling or only one single UE. The indications can enable different scheduling operations for UL transmissions associated with a PUSCH, a PUCCH or other physical channel based on whether multiple UEs or a single UE is being scheduled.

For example, a UL grant with an indication can be generated/transmitted, or received/processed by the scheduling component 332 to indicate whether to schedule the one or more UL transmissions within the first transmission opportunity or a second transmission opportunity that is outside of the first transmission opportunity. This indication can be an explicit timing relationship or a subframe range as part of the DL transmission to enable scheduling of multiple UL subframes in a different TxOP outside of the UL grant(s).

Figure 4:
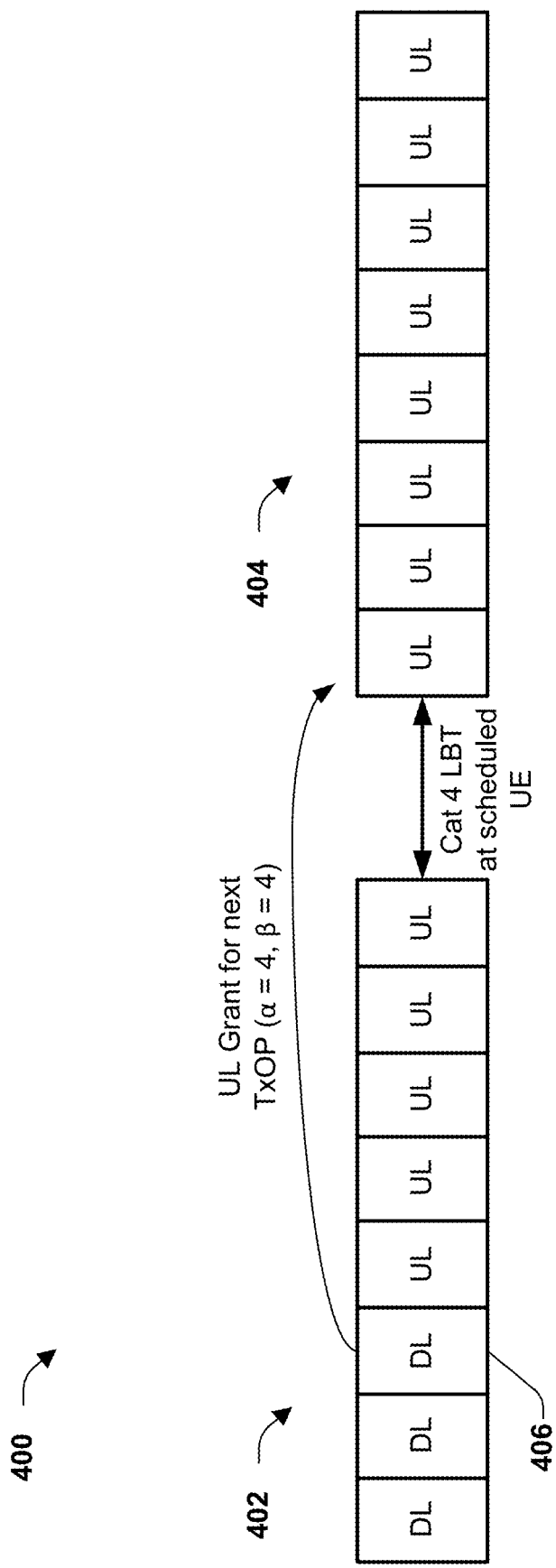
FIG. 4 illustrates an example cross-TxOP scheduling operation with a timing schedule according to various aspects or embodiments.

Referring briefly to FIG. 4, illustrated is an example cross TxOP scheduling with an explicit timing relationship indication. In one embodiment, the TxOP 402 can provide UL grant(s) 406 that schedule one or a single subframe or multiple subframes. In this embodiment, the presence of a potential PUSCH transmission can be indicated by the UL grant in the previous TxOP 402 with an explicit timing relationship, which can operate to indicate cross-TxOP scheduling on a different TxOP 404 than the UL grant(s) and also serve to indicate the particular subframes in the different TxOP for the UE to schedule UL transmissions. When scheduling multiple subframes in the second TxOP 404, a UL grant 406 can be transmitted in subframe n, for example, indicating that subframes from $n+\alpha$ to $n+\alpha+\beta$, where $\alpha$ is greater than or equal to 0, and $\beta$ is an integer greater than zero, can be used for UL transmission by a UE (e.g., UE 110 or the like). As such a range of subframes can be provided from $n+\alpha$ to $n+\alpha+\beta$ within the DL transmission and serve as an indication of cross-TxOP scheduling and the particular subframe range for scheduling transmission at the outside TxOP.

In one example, these timing relationships can be indicated as $\alpha=4$, $\beta=4$, $\alpha=8$, $\beta=8$, or otherwise, for example. Alpha ($\alpha$) can designate a starting point and beta ($\beta$) can designate an ending point. Alternatively, Beta can designate an offset of a number of subframes from alpha, for example, by which the UE can schedule UL subframes. Indices or other identifiers of the particular subframes can also be transmitted and associated with a single UE or corresponding differently to one or more different UEs as well with one or more different offsets, ranges, or explicit timing relationships, which can indicate particular subframes for scheduling transmissions by the one or more UE devices 110, 112, 114, 116, 118.

A UE (e.g., 110 or 116) can be indicated whether the subframe scheduled by UL grant 406 is within TxOP 402 or an outside TxOP 404. This indication could further be utilized by the UE 110 to determine the type of LBT to be performed by UE, such as a category 4 LBT or a single interval LBT that is shorter. Before the transmission of the PUSCH transmission in the outside TxOP 404, for example, the UE 110 can perform 110 a Cat 4 LBT, while for the case when PUSCH is within the TxOP, a single interval LBT is performed. The parameters for the Cat 4 LBT to be used are based on the priority class associated with the traffic scheduled for the UE, which can be provided by the eNB 102 accordingly.

In another embodiment, the type of cross-TxOP scheduling to be used for UL scheduling, can be explicitly provided via the UL grant to indicate if the UL grant uses eNB triggered cross-TxOP or uses explicit timing relationship to indicate expected subframe(s) containing PUSCH transmission. In this manner, the UE 110 can be signaled by the eNB 102 to use the outside TxOP 404 for scheduling by an explicit indication or by accompanying timing relationships between the UL grants and the UL transmission subframes.

Additional embodiments can relate to various design aspects of the case when the eNB 102 schedules a UE 110, for example, with a fixed time relationship between grants and transmission including the signaling, UL LBT and extensions to multi-carrier UL scheduling in unlicensed spectrum.

Figure 5:
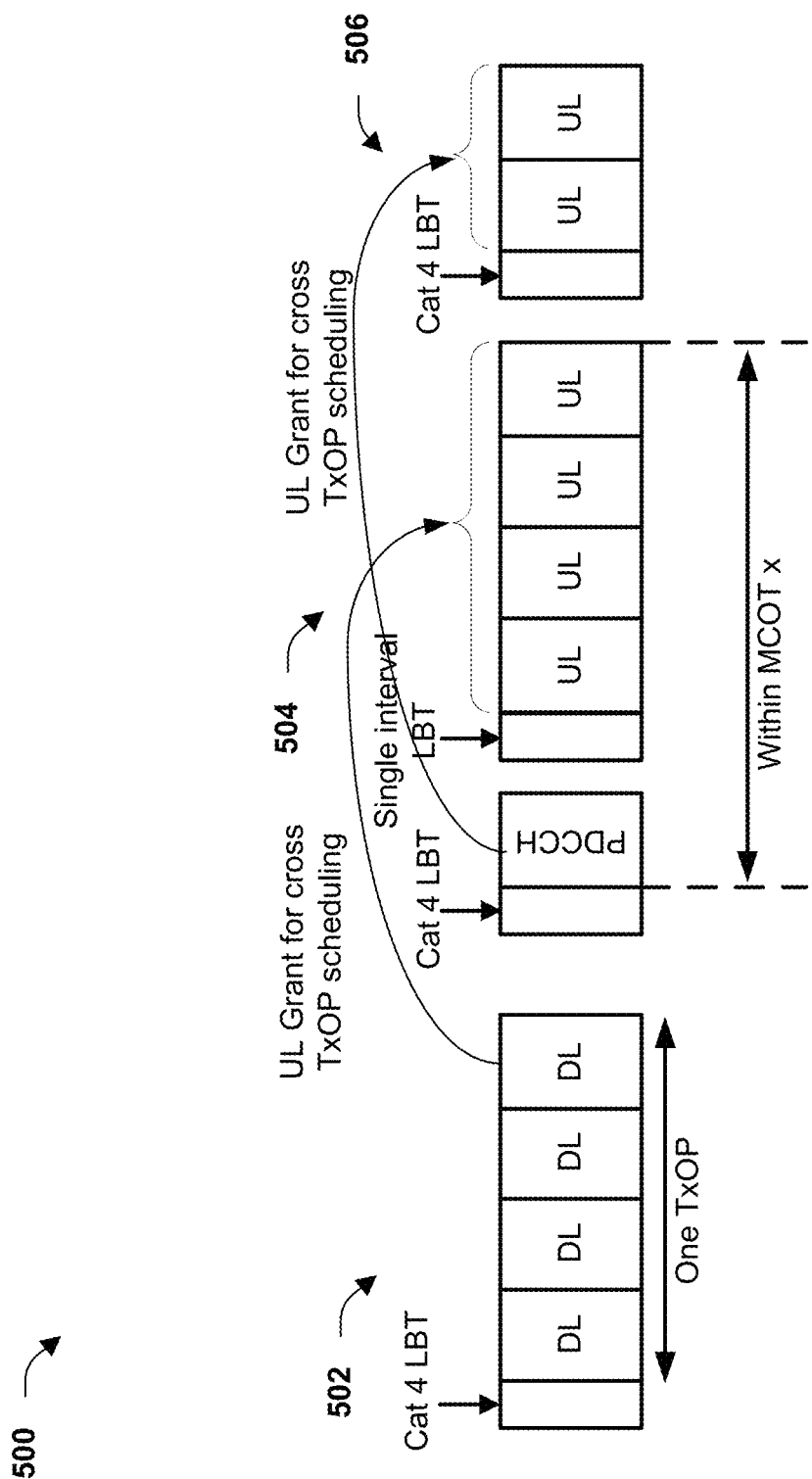
FIG. 5 illustrates another example cross-TxOP scheduling operation according to various aspects or embodiments.
Figure 6:
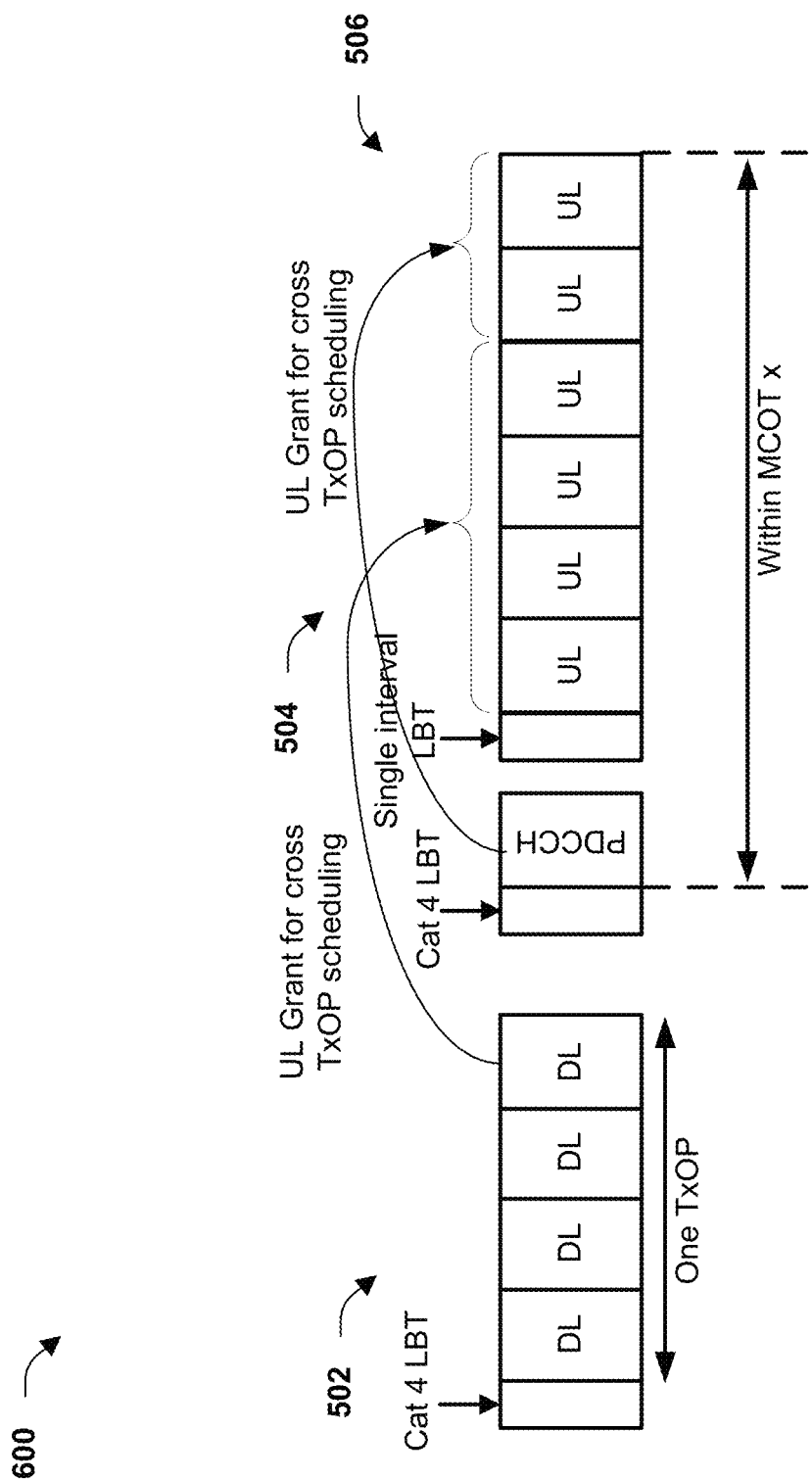
FIG. 6 illustrates another example cross-TxOP scheduling operation according to various aspects or embodiments.
Figure 7:
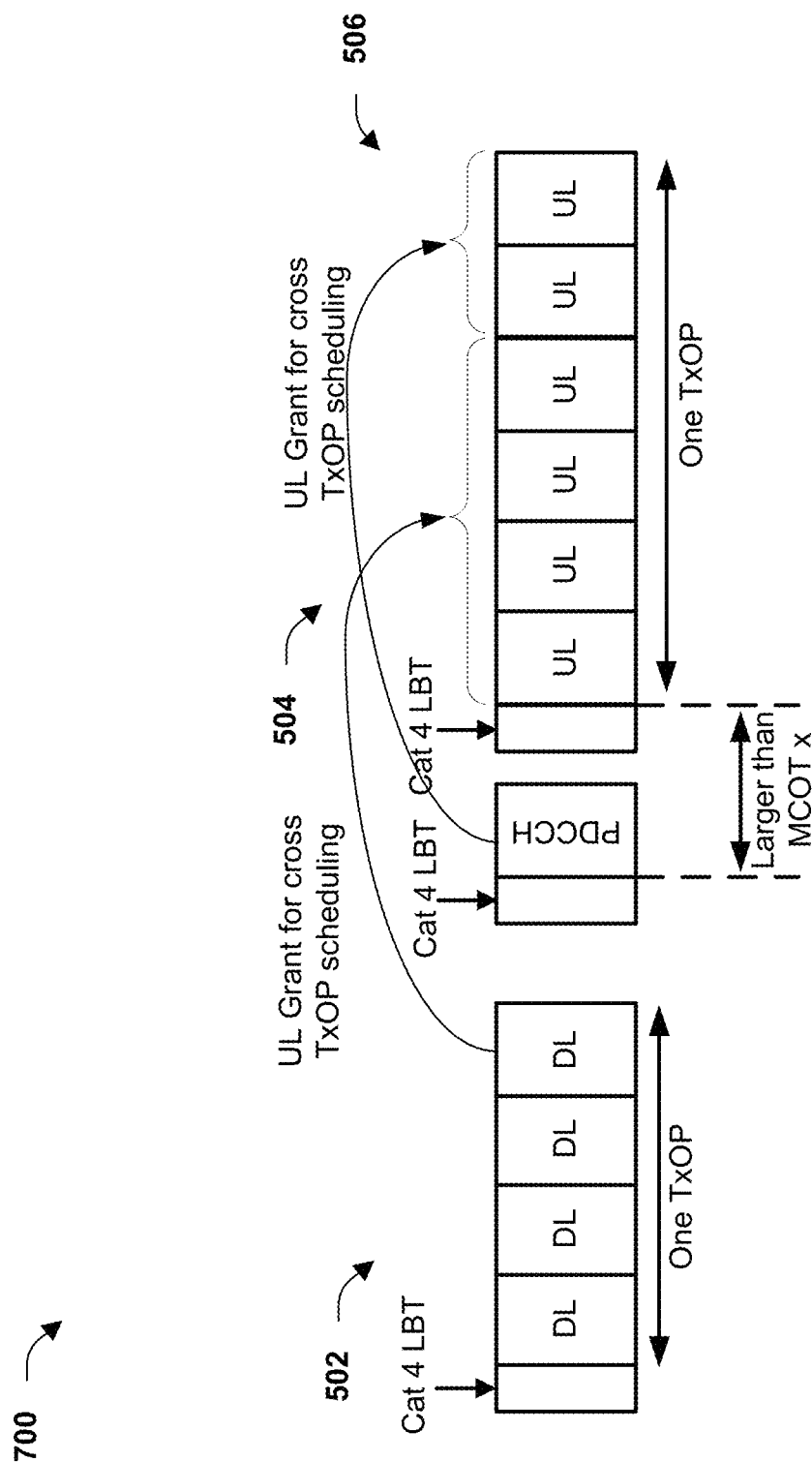
FIG. 7 illustrates another example cross-TxOP scheduling operation according to various aspects or embodiments.

Referring to FIGS. 5-7, illustrate relates operations for enabling cross-TxOP when the eNB schedules UE with fixed time relationship between grants and transmissions 500, 600 and 700. Where an explicit eNB trigger is not present, the timing relationship can provide indication to the UE 110, for example, of cross-TxOP scheduling as well as the offsets or ranges by which to schedule subframes of a portion of a TxOP 504 or 506 that correspond to the UL grant(s) in a portion of a TxOP 502 of FIG. 5. Here both scenarios of portion or subframes 504 being within the MCOT of the TxOP 502 and portion or subframes being outside the TxOP 502 and the corresponding MOOT for the outside TxOP 506.

When the eNB 102 schedules a UE 110 with fixed time relationship between grants and transmission, the UL grant transmitted in subframe n can indicate that subframes from $n+\alpha$ to $n+\alpha+\beta$, $\alpha>=0$ can be used for UL transmission by the UE. The values of $\alpha$ and/or $\beta$ can be dynamically indicated by UL grant or can be semi-statically fixed by RRC configuration or RRC signaling. The choice of $\alpha$ and $\beta$ can also be fixed for the entire system without any explicit indication, such as $\alpha=4$, and $\beta=8$ for example.

In some embodiments, before a PUSCH transmission the UE 110 is indicated if the subframe scheduled by UL grant is within TxOP or outside TxOP. This indication can also determine or trigger the type of LBT to be performed by the UE 110. Before the transmission of the PUSCH transmission outside TxOP 506, the UE 110 can perform a cat 4 LBT, while for the case when PUSCH is within the TxOP, a single interval LBT is performed. In the subframe relationship 500, UL transmissions or subframe portions 504 within the same MCOT or TxOP are triggered or indicated with a single interval LBT to be performed before transmission by the UE 110, for example, while the PDCCH being scheduled outside of the MCOT or TxOP is preceded by a category 4 LBT by the UE generating the UL transmission. Here, different data UL grants or a PDCCH to a same UE can differ in being cross-TxOP scheduled or not cross-TxOP scheduled.

In the subframe relationship 600 of FIG. 6, all similar subframes are within the MCOT or TxOP and not outside TxOPs, as such UL grants and the PDCCH data being scheduled are triggered to be scheduled with only a single interval LBT before scheduling. This saves time and prevents the double LBT, where a complete category 4 LBT is not performed by both the eNB 102 and the UE 110.

In the subframe relationship 700 of FIG. 7, all of the UL grants and PDCCH subframes being scheduled are outside of the TxOP and is larger than the MCOT. As such, UL grants and PDCCH with subframe portions 504 and 506 can be scheduled on a different TxOP, and thus trigger or indicate to the UE a category 4 LBT to be performed before scheduling of any UL subframes.

The parameters for the Cat 4 LBT to be used can be based on the priority class associated with the traffic scheduled for the UE 110, for example. The eNB 102 can explicitly indicate the Cat 4 LBT parameters to be used for performing UL LBT at the UE 110, which can also serve as part of the indications with the UL grants. Referring back to FIG. 3, indications or parameters can be generated or processed by the scheduling component 332 to indicate the type of LBT protocol to be performed. In one example, a UE could be signaled via an indication whether the subframe scheduled by UL grant is within the same TxOP or outside the same TxOP. This indication could also be utilized to determine the LBT to be performed by the UE 110, such as a category 4 LBT protocol (cat 4 LBT) or a shorter LBT protocol such as a single interval LBT or a clear channel assessment, for example. Before the transmission of the PUSCH transmission outside TxOP 502, the UE 110 can thus perform a cat 4 LBT, while for the case when PUSCH is within the TxOP 502 a single interval LBT with a just a clear channel assessment puncturing the first symbol could be performed. As such, the UE 110 can know which LBT to perform and not incur the double LBT penalty to UL throughput based on an indication to schedule TxOP outside of or within the same TxOP 502 as the UL grant(s).

Figure 8:
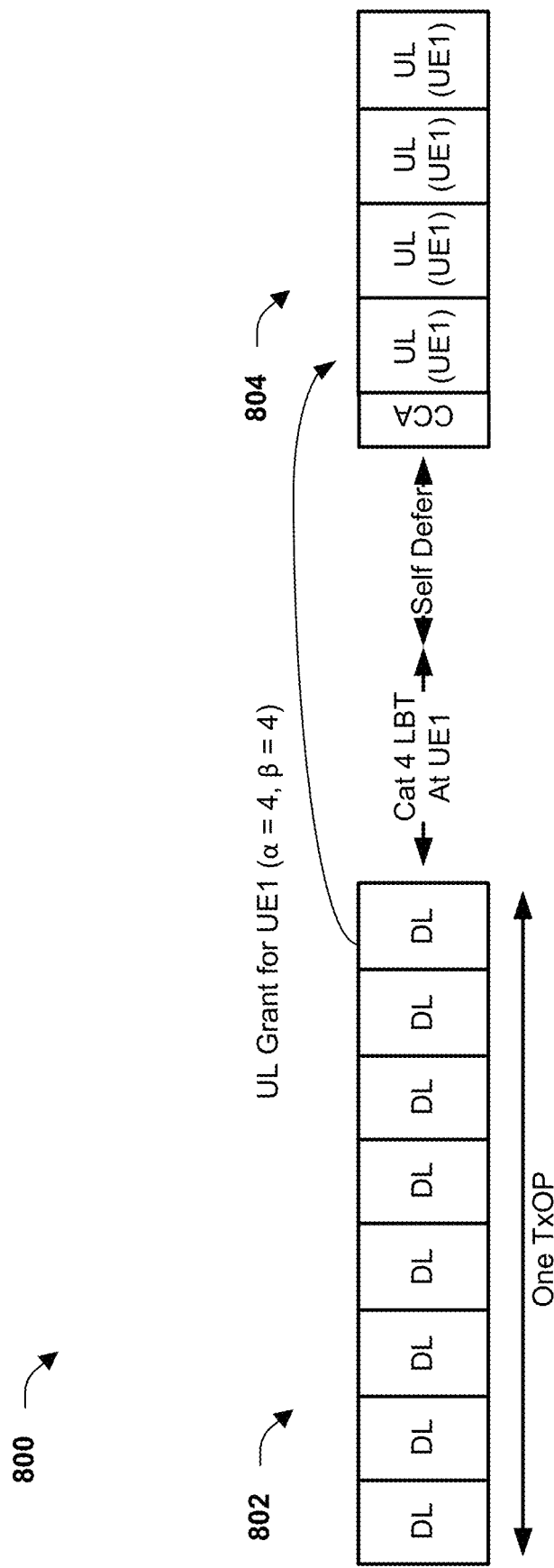
FIG. 8 illustrates another example cross-TxOP scheduling operation according to various aspects or embodiments.
Figure 9:
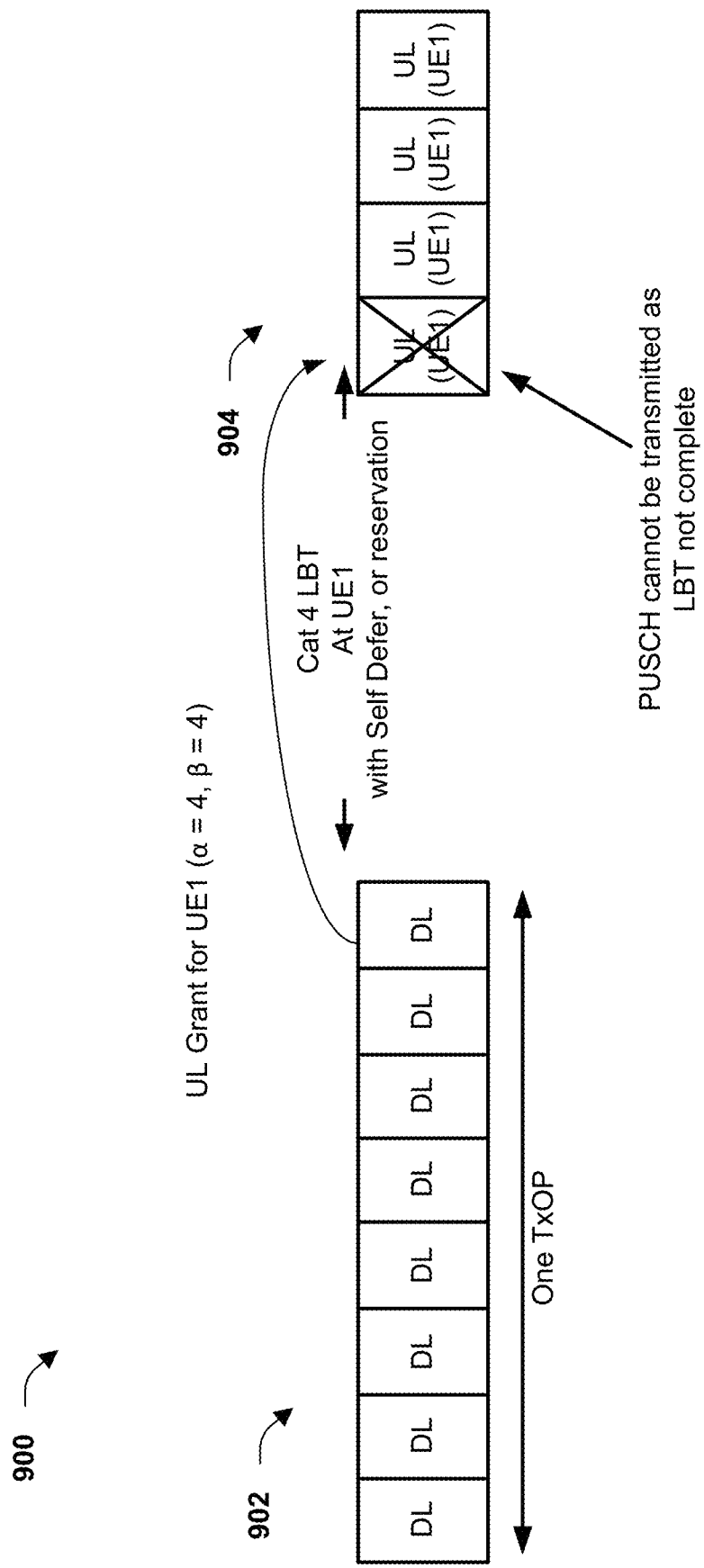
FIG. 9 illustrates another example cross-TxOP scheduling operation according to various aspects or embodiments.

Referring to FIGS. 8-9, illustrated are transmissions corresponding to outside TxOP transmissions by UL grants for cross-TxOP scheduling in accordance with various aspects.

The cross-TxOP scheduling relationship 800 of FIG. 8, for example, can be utilized in association with a single UE 110 where only one UE is being scheduled by a DL transmission 802 with UL grants for outside TxOP transmission. In other embodiments, multiple UEs can be scheduled on a single DL transmission (e.g., 802).

As discussed above, in some embodiments, the UE (e.g., 110, 116 or other UE devices of FIG. 1) scheduled within the same TxOP can receive an indication or trigger to perform a single interval LBT or a short category 4 LBT with just a clear channel assessment, for example, by puncturing a first symbol of PUSCH transmission. As stated above, this can be provided explicitly (e.g., via a common PDCCH) or indicate via a timing relationship parameter (e.g., alpha α, beta β, or other parameter). Likewise, when scheduled in another TxOP, the UEs can be provided an indication or trigger to perform a category (Cat) 4 LBT protocol that is longer in duration than the short interval LBT with a clear channel assessment and a random backoff procedure.

In another embodiment, when initiating a cross-TxOP the LBT protocol can be varied based on indications in the DL transmission burst 802 to the UE 110 from the eNB 102. For example, the scheduled UE 110 in the next TxOP 804, which is outside of the TxOP 802, can perform a Cat 4 LBT with a self-defer. A self-defer can be a pre-configured interval by which the UE 110 initiates to defer any action within the time of the interval, or alternatively can be signaled or triggered by the eNB 102 (e.g., via a reservation signal indication or the like). With self-defer, if the UE 110 completes Cat 4 LBT before a transmission (e.g., a PUSCH transmission), the UE 110 can then perform a clear channel assessment (CCA) check such as a single interval LBT before the transmission of the PUSCH transmission and after the self-defer operation.

In particular, the scheduled UE 110 can start the PUSCH transmission at the subframe boundary when completing a category 4 LBT protocol on time or substantially near a subframe boundary. If the category 4 is not completed close to the subframe boundary, the UE 110, for example, can initiate a deferral period or a self-defer, while afterwards performing only a CCS and avoid a double category 4 LBT or performing the same LBT protocol twice within or for a same TxOP. The scheduled UE 110 can then initiate a PUSCH transmission after a second symbol of the subframe containing the PUSCH transmission depending the time when the cat 4 LBT protocol completes; so that when a category 4 LBT is not completed close to a subframe boundary, a self-defer operation can be initiated.

In another embodiment, the eNB 102 can perform a blind detection to determine the start of the PUSCH transmission. For example, the scheduling component 330 can be configured to determine a start of the one or more UL transmissions of the PUSCH based on a blind detection in response to the one or more UL grants being associated with a single UE. Additionally or alternatively, the eNB 102 can determine UL transmission starts based on one or more start indications being provided explicitly from different UEs (e.g., 110 and 116, or the like) where a cross-TxOP between different TxOPs are being enabled.

Referring to FIG. 9, illustrated is an example of where a UL grant operates to enable a cross-TxOP scheduling for a single UE (e.g., UE 1 or UE 110) of a wireless communication network. The LBT protocol (e.g., a category 4 LBT) can be completed successfully such as with an idle channel determination. The UE 110 being scheduled with a cross-TxOP UL grant in a DL transmission 902 within a first TxOP can start the PUSCH transmission at the subframe boundary when completing a category 4 LBT protocol on time or substantially near a subframe boundary within a different TxOP or transmission 904. As such, an additional CCA or further LBT protocol can be avoided before transmission 904. The scheduled UE 110 can then initiate a PUSCH transmission after a second symbol of the subframe containing the PUSCH transmission depending the time when the cat 4 LBT protocol completes and further corresponding to the UL grant within the different TxOP. If completed before all UL grants scheduling transmission within the second outside TxOP then all UL subframes can be transmitted, if the LBT completes within or after the second TxOP initiates, then remaining UL grants can be utilized for scheduling corresponding UL subframes.

In another embodiment, the eNB 102 (e.g., via scheduling component 330 or LBT component 332) can explicitly indicate (via one or more bits or packet data) whether a reservation signal can be used as part of an LBT protocol (e.g., category 4 LBT or otherwise) before an UL transmission 904 (e.g., a PUSCH transmission). This indication, for example, can be communicated explicitly via L1 signaling, which can be suitable when a single UE is scheduled in the first PUSCH transmission within the next TxOP. As such, the scheduled UE 110, for example, can perform a Cat 4 LBT protocol with a reservation signal in the next TxOP, which can operate to reserve the channel from being busy for use. The reservation signal can also serve to avoid a self-defer or an additional CCA because the channel can be kept idle for a particular duration via the reservation signal. The scheduling component 330 or LBT component 332 can each or individually be a part of, located at or included in a media access control (MAC) layer, a physical (PHY) layer, or other OSI layer of an OSI protocol.

As stated above in reference to FIG. 8, a self-defer can be a pre-configured interval by which the UE 110 initiates to defer any action within the time of the interval, or alternatively can be signaled or triggered by the eNB 102. In another embodiment, when a reservation signal is not being permitted or indicated as part of the indications in a DL transmission (e.g., 902), this can trigger or enable a self-defer by the UE 110 to be used when an LBT (e.g., Cat 4 LBT) is completed before the UL transmission or enabled scheduling grant of UL subframes. If a reservation signal is communicated as allowed/enabled, then a self-defer operation or CCA could be avoided.

Figure 10:
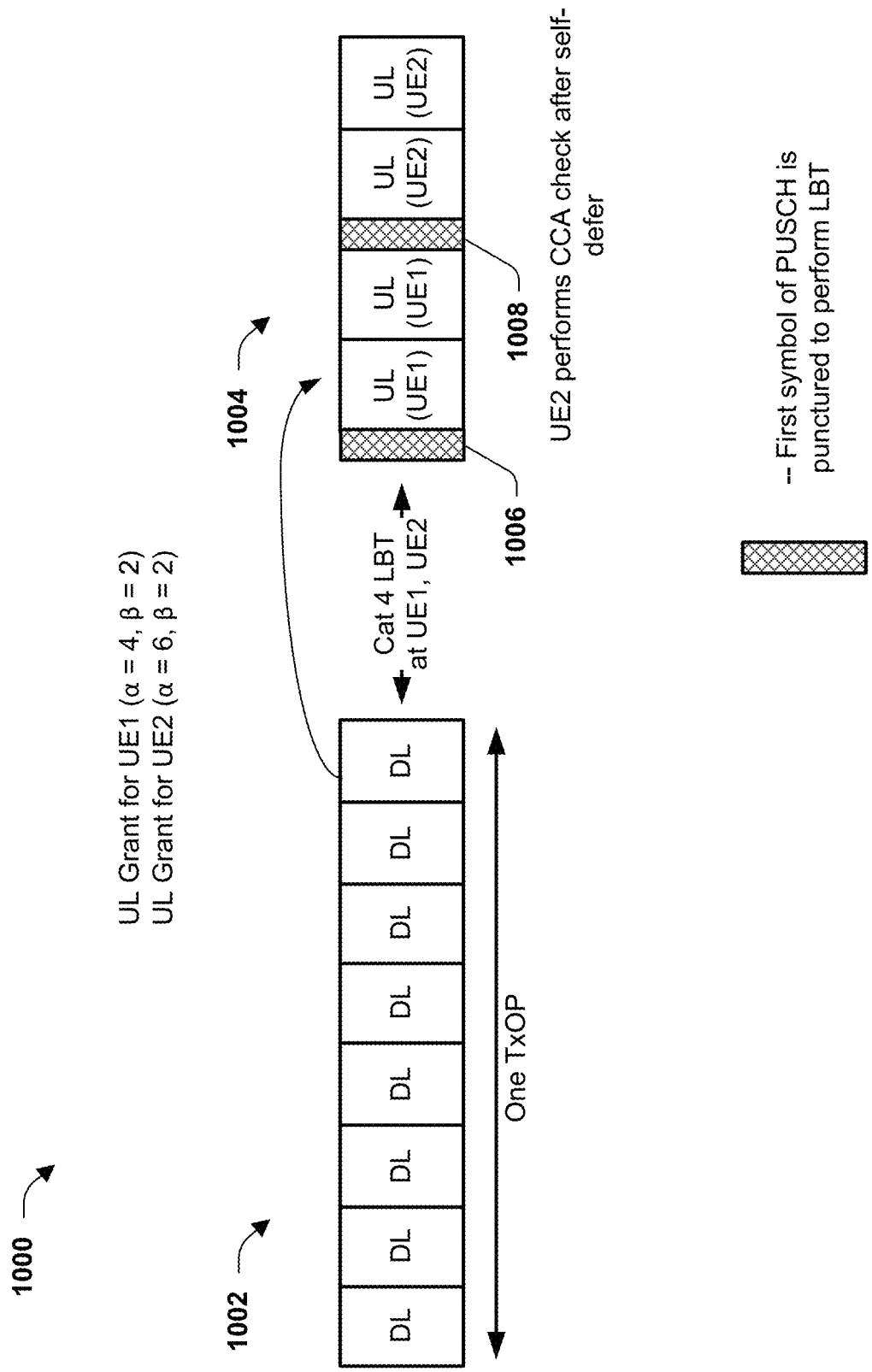
FIG. 10 illustrates another example cross-TxOP scheduling operation according to various aspects or embodiments.
Figure 11:
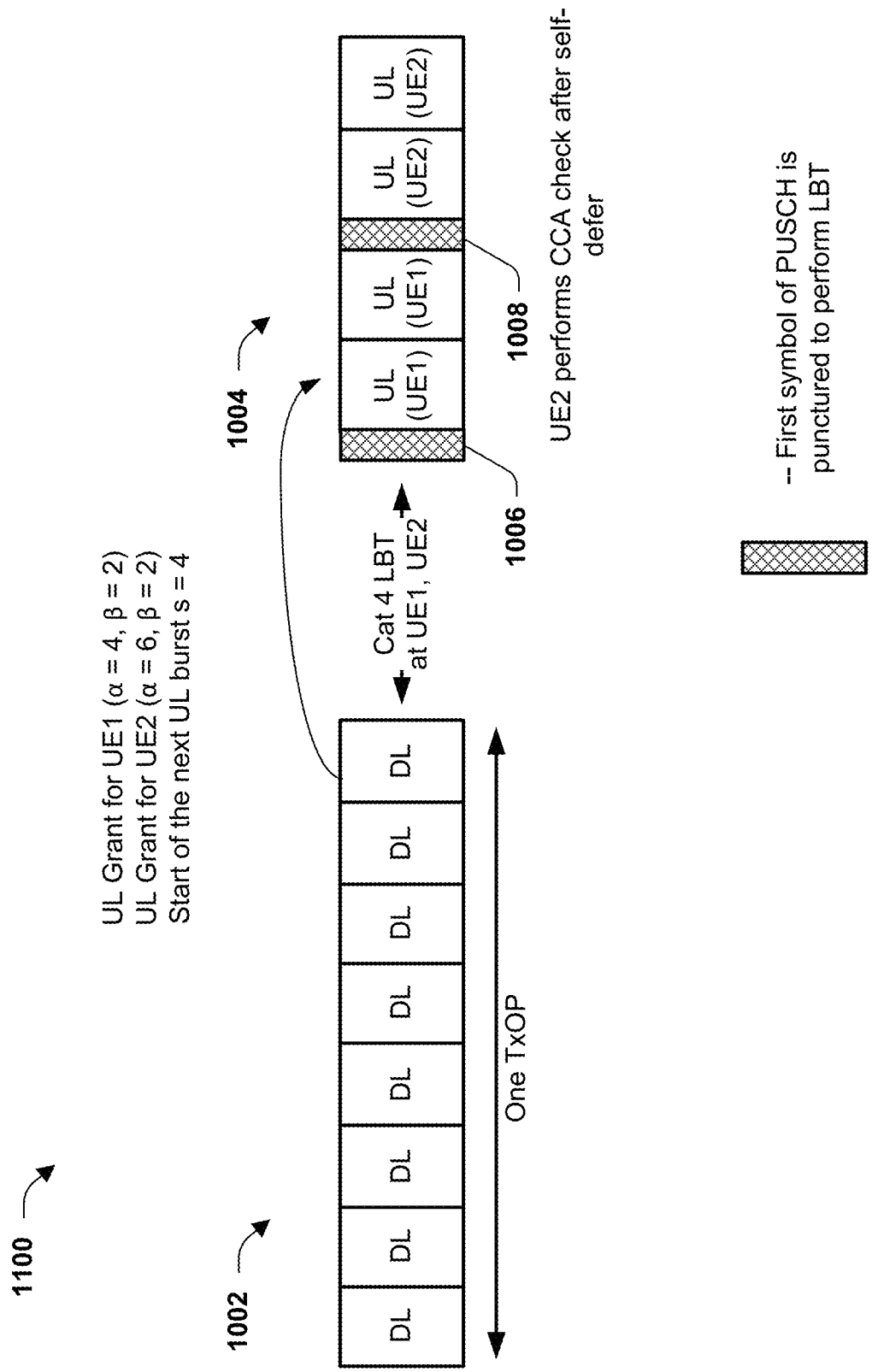
FIG. 11 illustrates another example cross-TxOP scheduling operation according to various aspects or embodiments.

Referring to FIGS. 10-11, illustrated are examples of multi-user (multi-UE) signaling with cross-TxOP scheduling operations. In an aspect, FIG. 10 illustrates the case when multiple UEs (e.g., UE devices 110, 112, 114, 116, 118, etc.) are scheduled by the eNB 102, for example, in one TxOP for outside TxOP. All UEs 110, 112, 114, 116, 118 that are scheduled on that particular TxOP could successfully complete Cat 4 before an associated transmission (e.g., an UL transmission or PUSCH transmission). This scheduling of multiple UEs for cross-TxOP scheduling on a same TxOP 1002 can operate LBT operations in accordance with the various embodiments discussed herein. As such, each UE can implement LBT protocols with a self-defer or reservation signal based on pre-configurations or explicit/implicit signaling (e.g., via L1 for reservation signal enabling or not). Based on whether the LBT protocol completes before the UL scheduling or not a self-defer signal with a CCA 1006 or 1008 for each UE being scheduled can be enabled. UEs scheduled later than other UEs, for example, can perform CCA checks after different self-deferral intervals or offsets.

Referring to FIG. 11, illustrated are examples of multi-user (multi-UE) signaling with cross-TxOP scheduling operations. When multiple users are scheduled across subframes within a TxOP, it can be advantageous for the scheduled UEs 110, 112, 114, 116, 118 to indicate the start of the UL burst transmission 1004 with respect to the UL grant that is scheduled outside of the TxOP 1002. Specifically, all UEs 110, 112, 114, 116, 118 that are scheduled for the next TxOP 1004 can be indicated a corresponding offset (e.g., S), in which the offset (s) can correspond with respect to the UL grant, from there the UL burst 1004 can start via common PDCCH or the UL grant. These offsets (e.g., s=4) can indicate a number of subframes for a next UL burst. In one example, alpha can be 4 (where alpha can be greater than or equal to zero as part of n=alpha (α), n being the subframe, subframe designation, or subframe index). Beta or β can be 2, for example so that the range from subframe n+4 to n+6 is associated with a particular UE 110, for example, and the offset s of each transmission burst can be four to designate four subframes before another UL burst can occur.

Figure 12:
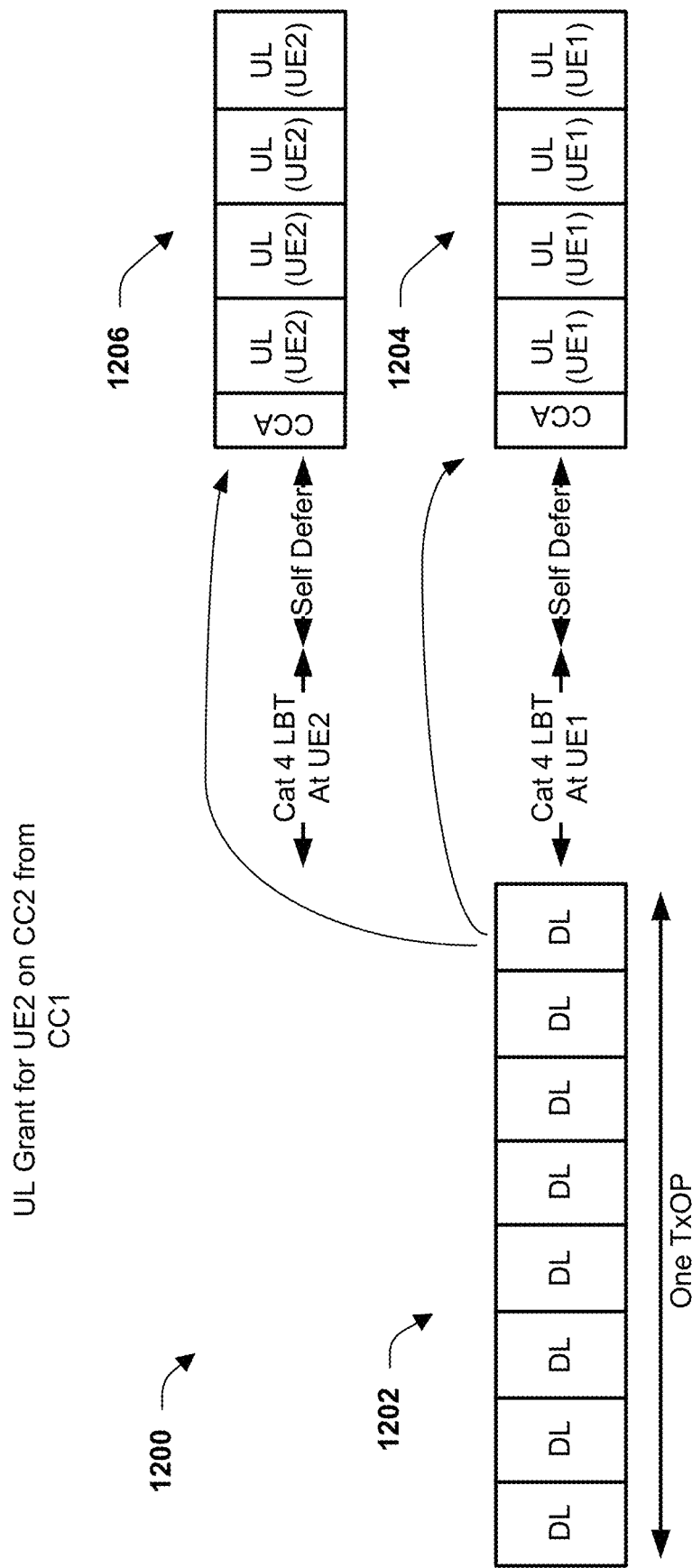
FIG. 12 illustrates another example cross-TxOP scheduling operation according to various aspects or embodiments.

Referring to FIG. 12, illustrated is an example of cross-carrier/cross-TxOP scheduling for multiple carriers. Here, the transmission 1202, as a DL transmission with UL grants and one or more indications corresponding to an outside TxOP transmission 1004 as discussed herein can be designated/assigned for multiple UEs, in which the multiple UEs correspond to different carriers, component carriers or frequency carriers.

In particular, the eNB 102 can schedule UEs 110, 112, 114, 116, 118 with a fixed timing relationship between grants and transmission on different components carriers, such that a UL grant and the corresponding PUSCH transmission can occur on different component carriers. The behavior of the UE (e.g., 110, 112, 114, 116, 118) for PUSCH transmission with cross-carrier scheduling can be similar or the same as if the UE is scheduled outside TxOP. Specifically, a scheduled UE (e.g., 110, 112, 114, 116, 118) could complete a Cat 4 LBT before the start of TxOP 1204, if the TxOP starts with an UL subframe that is scheduled.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 13:
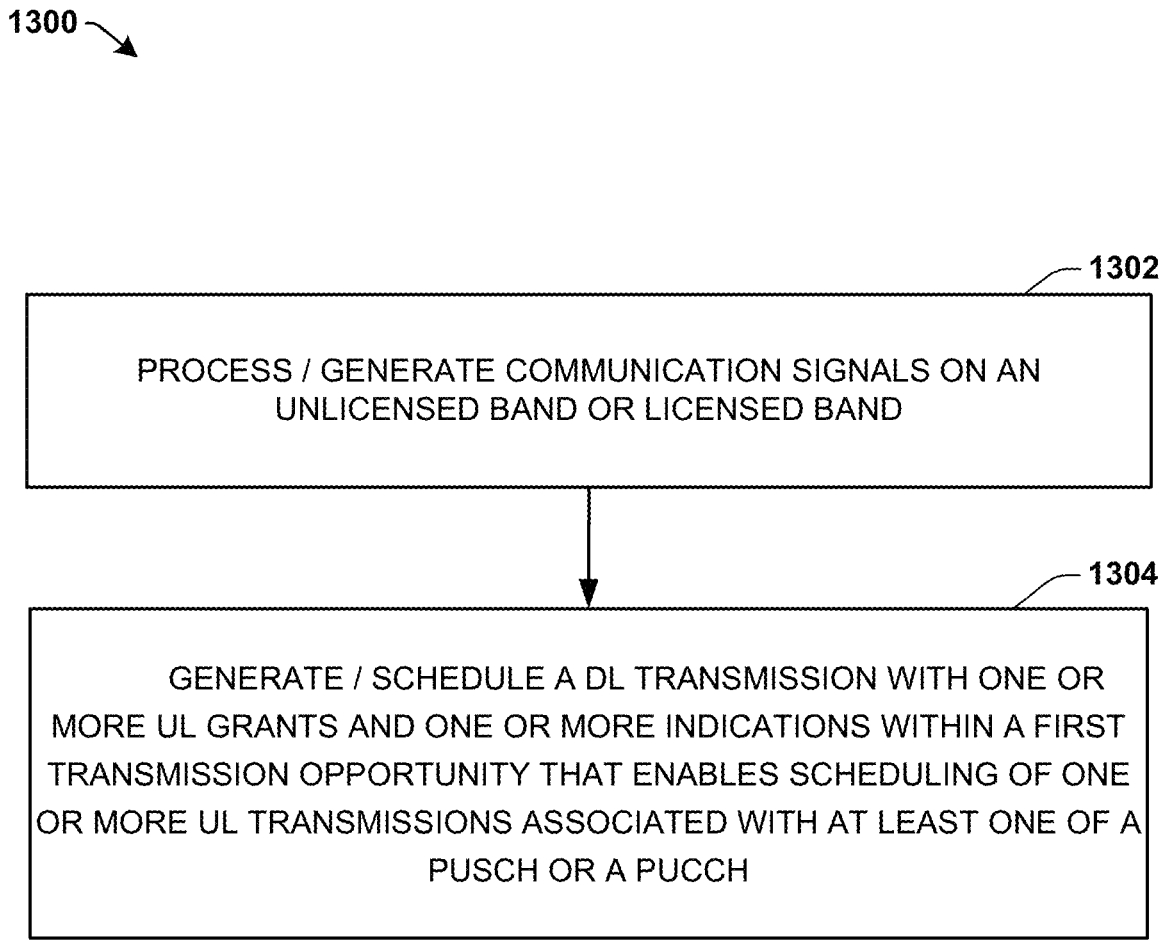
FIG. 13 illustrates an example process flow for cross-TxOP scheduling operations according to various aspects or embodiments.

FIG. 13 illustrates another example process flow or method 1300 for cross-TxOP scheduling operations as described herein for improving throughput and efficiency of a wireless network scheduling in transmissions. At 1302, an eNB or a UE can process communication signals on at least one of an unlicensed band or a licensed band. In the case of an eNB in LAA, for example, an LBT protocol can be performed, and if the channel or band is idle then signal UL grants within a TxOP corresponding to an MOOT parameter. The UL grants can accompany one or more indications, which can be explicitly communicated or implicitly generated to one or more UEs across a given TxOP. Similarly, the UEs (e.g., 110, 116) can operate to process UL grants and the indications, while generating corresponding UL transmission or related communications to the network or the eNB (e.g., eNB 102 or the like).

At 1304, a DL transmission can be generated or an UL transmission scheduled with one or more UL grants and one or more indications within a first transmission opportunity that enables the scheduling (e.g., via one or more UEs communicatively coupled to the wireless network of the eNB 102) of one or more UL transmissions associated with at least one of a PUSCH or a PUCCH. The one or more indications, for example, can comprise an indication of whether to schedule the one or more UL transmissions within the first transmission opportunity or a second transmission opportunity that is outside of the first transmission opportunity.

In other embodiments, the DL transmission can be provided or received with an indication of a subframe range or a timing relationship between the one or more UL grants. The UL transmissions can enable a scheduling of subframes corresponding to the one or more UL transmissions within a second transmission opportunity based on the subframe range or the timing relationship.

The DL transmission can also provide indication of an LBT indication of whether to perform a category 4 LBT protocol or a clear channel assessment with a single LBT interval that is shorter than the category 4 LBT protocol, on the unlicensed band or the licensed band. For example, an explicit signaling (e.g., via an L1 signal of an L1 interface) can provide a further indication of whether to utilize a reservation signal to reserve the unlicensed band or the licensed band in response to completing the category 4 LBT protocol before a scheduled subframe boundary. The Cat 4 LBT can also be in response to or when UL transmissions are scheduled within the second transmission opportunity that is outside of the first transmission opportunity. Further an offset can be indicated also as another indication to enable a timing relationship associated with the one or more UL grants in scheduling subframes corresponding to the one or more UL transmissions from multiple different UEs within the second transmission opportunity.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed in an evolved NodeB ("eNB") comprising: one or more processors configured to execute executable instructions stored in a memory for one or more executable components comprising: a communication component configured to process communication signals on an unlicensed band or a licensed band; and a scheduling component configured to generate a downlink ("DL") transmission with one or more uplink ("UL") grants and one or more indications within a first transmission opportunity, wherein the one or more indications enable scheduling one or more UL transmissions associated with a physical UL shared channel ("PUSCH") or a physical UL control channel ("PUCCH") and indicate whether to schedule the one or more UL transmissions within the first transmission opportunity or a second transmission opportunity that is outside of the first transmission opportunity.

Example 2 includes the subject matter of Example 1, wherein the scheduling component is further configured to generate the DL transmission with the one or more indications comprising a subframe range or a timing relationship between the one or more UL grants and the one or more UL transmissions to enable a scheduling of subframes corresponding to the one or more UL transmissions within the second transmission opportunity.

Example 3 includes the subject matter of any one of Examples 1-2, including or omitting optional elements, wherein the scheduling component is further configured to generate the DL transmission with a listen before talk ("LBT") indication of whether to perform a category 4 LBT protocol or a clear channel assessment with a single LBT interval that is shorter than the category 4 LBT protocol, on the unlicensed band or the licensed band.

Example 4 includes the subject matter of any one of Examples 1-3, including or omitting optional elements, wherein the communication component is further configured to generate, via an L1 signal of an L1 interface, another indication of whether to utilize a reservation signal to reserve the unlicensed band or the licensed band in response to completing the category 4 LBT protocol before a scheduled subframe boundary and the one or more UL transmissions being scheduled within the second transmission opportunity.

Example 5 includes the subject matter of any one of Examples 1-4, including or omitting optional elements, wherein the scheduling component is further configured to generate the one or more UL grants as corresponding to different UEs and trigger the different UEs to perform a category 4 LBT protocol before transmitting the one or more UL transmissions based on the one or more UL grants.

Example 6 includes the subject matter of any one of Examples 1-5, including or omitting optional elements, wherein the scheduling component is further configured to generate the one or more indications to indicate one or more offsets of the different UEs that enable a timing relationship in a scheduling of subframes between the one or more UL grants and the one or more UL transmissions from the different UEs within the second transmission opportunity.

Example 7 includes the subject matter of any one of Examples 1-6, including or omitting optional elements, wherein the scheduling component is further configured to determine a start of the one or more UL transmissions of the PUSCH based on a blind detection in response to the one or more UL grants being associated with a single UE, or based on a plurality of start indications provided by different UEs in response to the one or more UL grants within the first transmission opportunity being associated with the different UEs in the second transmission opportunity.

Example 8 includes the subject matter of any one of Examples 1-7, including or omitting optional elements, wherein the scheduling component is further configured to generate the one or more UL grants with the one or more indications indicating a scheduling of the one or more UL transmissions on a first component carrier that is different from a component carrier of the DL transmission.

Example 9 includes the subject matter of any one of Examples 1-8, including or omitting optional elements, wherein the scheduling component is further configured to generate the one or more UL grants with the one or more indications indicating a scheduling of the one or more UL transmissions on different component carriers associated with different UEs, respectively.

Example 10 is an apparatus configured to be employed in a user equipment ("UE") comprising: one or more processors configured to execute executable instructions stored in a memory for one or more executable components comprising: a communication component configured to communication signals on at least one of: an unlicensed band or a licensed band; and a scheduling component configured to process a downlink ("DL") transmission comprising one or more UL grants and one or more indications within a first transmission opportunity that enables scheduling one or more uplink ("UL") transmissions associated with a physical UL shared channel ("PUSCH") or a physical UL control channel ("PUCCH"), wherein the one or more indications comprise an indication of whether to schedule the one or more UL transmissions within the first transmission opportunity or a second transmission opportunity that is different than the first transmission opportunity.

Example 11 includes the subject matter of Examples 10, wherein the scheduling component is further configured to process the DL transmission from a physical downlink control channel ("PDCCH") transmission with the one or more UL grants to obtain the indication of whether to schedule the one or more UL transmissions within the first transmission opportunity or the second transmission opportunity and schedule the one or more UL transmissions of the PUSCH or PUCCH within the second transmission opportunity based on the one or more indications of the DL transmission.

Example 12 includes the subject matter of any one of Examples 10-11, including or omitting optional elements, wherein the scheduling component is further configured to schedule the one or more UL transmissions based on another indication from the one or more UL grants of a subframe range or of which particular subframes of a plurality of subframes to schedule the one or more UL transmissions within the second transmission opportunity.

Example 13 includes the subject matter of any one of Examples 10-12, including or omitting optional elements, further comprising: a listen before talk component is configured to perform a category 4 listen before talk ("LBT") protocol in response to the one or more indications of the DL transmission indicating to schedule the one or more UL transmissions within the second transmission opportunity or that the one or more UL grants correspond to more than one UE, and further configured to perform a clear channel assessment that is shorter than the category 4 LBT protocol in response to the one or more indications indicating to schedule the one or more UL transmissions within the first transmission opportunity, on the unlicensed band or the licensed band.

Example 14 includes the subject matter of any one of Examples 10-13, including or omitting optional elements, wherein the listen before talk component is further configured to perform the category 4 LBT protocol with a self-deference interval in response to the category 4 LBT protocol being completed before a subframe boundary that is scheduled with the one or more UL transmissions on the second transmission opportunity, or with a reservation signal on the unlicensed band or the licensed band in response to a reservation indication of the one or more indications enabling a reservation of the unlicensed band or the licensed band.

Example 15 includes the subject matter of any one of Examples 10-14, including or omitting optional elements, wherein the listen before talk component is further configured to perform the clear channel assessment at a first symbol before communicating the one or more UL transmissions in response to performing the category 4 LBT protocol with the self-deference interval, and communicating the one or more UL transmissions after a second symbol of a subframe scheduled to transmit the one or more UL transmissions based on a completion time of the category 4 LBT protocol.

Example 16 includes the subject matter of any one of Examples 10-15 including or omitting optional elements, wherein the listen before talk component is further configured to switch between performing the category 4 LBT protocol and the clear channel assessment based on at least one of: the indication, another indication of whether the one or more UL grants schedule the one or more UL transmissions for different UEs or a single UE, a further indication of whether a reservation signal is enabled, or whether the category 4 LBT protocol is completed successfully with a self-deference interval.

Example 17 includes the subject matter of any one of Examples 10-16, including or omitting optional elements, wherein the listen before talk component is further configured to generate the category 4 LBT protocol based on one or more parameters related to a priority class associated with a scheduled traffic flow and communicated via L1 or L2 signaling.

Example 18 includes the subject matter of any one of Examples 10-17, including or omitting optional elements, wherein the scheduling component is further configured to schedule the one or more UL transmissions within the second transmission opportunity based on an offset indication associated with different UEs being scheduled by the one or more UL grants of the DL transmission.

Example 19 includes the subject matter of any one of Examples 10-18, including or omitting optional elements, wherein the one or more UL grants indicate a scheduling of the one or more UL transmissions on a different component carrier than a component carrier of the DL transmission or another UE corresponding to the one or more UL grants of the DL transmission.

Example 20 is a computer-readable medium storing executable instructions that, in response to execution, cause one or more processors of an evolved NodeB ("eNB") to perform operations, comprising: process communication signals on at least one of: an unlicensed band or a licensed band; and generate a downlink ("DL") transmission with one or more UL grants and one or more indications within a first transmission opportunity that enables scheduling of one or more uplink ("UL") transmissions associated with at least one of a physical UL shared channel ("PUSCH") or a physical UL control channel ("PUCCH"); wherein the one or more indications comprise an indication of whether to schedule the one or more UL transmissions within the first transmission opportunity or a second transmission opportunity that is outside of the first transmission opportunity.

Example 21 includes the subject matter of Example 20, including or omitting optional elements, wherein the operations further comprise: generating the DL transmission with the one or more indications comprising another indication of a subframe range or a timing relationship between the one or more UL grants and the one or more UL transmissions that enables a scheduling of subframes corresponding to the one or more UL transmissions within the second transmission opportunity based on the subframe range or the timing relationship; generating the DL transmission with a listen before talk ("LBT") indication of whether to perform a category 4 LBT protocol or a clear channel assessment with a single LBT interval that is shorter than the category 4 LBT protocol, on the unlicensed band or the licensed band; and generating, via an L1 signal of an L1 interface, a further indication of whether to utilize a reservation signal to reserve the unlicensed band or the licensed band in response to completing the category 4 LBT protocol before a scheduled subframe boundary and the one or more UL transmissions being scheduled within the second transmission opportunity that is outside of the first transmission opportunity.

Example 22 includes the subject matter of any one of Examples 20-21, including or omitting optional elements, wherein the operations further comprise: generating the one or more UL grants corresponding to different UEs and trigger the different UEs to perform a category 4 LBT protocol before transmitting the one or more UL transmissions based on the one or more UL grants; and generating an other indication of an offset to enable a timing relationship associated with the one or more UL grants in scheduling subframes corresponding to the one or more UL transmissions from the different UEs within the second transmission opportunity.

Example 23 is a computer-readable medium storing executable instructions that, in response to execution, cause one or more processors of a user equipment ("UE") to perform operations, comprising: generating communication signals on at least one of: an unlicensed band or a licensed band; and scheduling one or more uplink ("UL") transmissions associated with at least one of a physical UL shared channel ("PUSCH") or a physical UL control channel ("PUCCH") based on a downlink ("DL") transmission with one or more UL grants and one or more indications within a first transmission opportunity; wherein the one or more indications comprise an indication of whether to schedule the one or more UL transmissions within the first transmission opportunity or a second transmission opportunity that is outside of the first transmission opportunity.

Example 24 includes the subject matter of Example 23, including or omitting optional elements, wherein the operations further comprise: performing a category 4 listen before talk ("LBT") protocol in response to the one or more indications of the DL transmission indicating to schedule the one or more UL transmissions within the second transmission opportunity; and performing a clear channel assessment that is shorter than the category 4 LBT protocol in response to the one or more indications indicating to schedule the one or more UL transmissions within the first transmission opportunity, on the unlicensed band or the licensed band, or in response to completing the category 4 LBT before a subframe boundary for the one or more UL transmissions on the second transmission opportunity and utilizing a self-deference interval; wherein the performing the clear channel assessment is performed at a first symbol before communicating the one or more UL transmissions after a second symbol of a subframe, in response to performing the category 4 LBT protocol with the self-deference interval.

Example 25 includes the subject matter of any one of Examples 23-24, including or omitting optional elements, wherein the operations further comprise: scheduling the one or more UL transmissions within the second transmission opportunity based on the indication and an offset indication corresponding to different UEs being scheduled by the one or more UL grants of the DL transmission; wherein the one or more UL grants indicate a scheduling of the one or more UL transmissions on a different component carrier than a component carrier of the DL transmission or another UE corresponding to the one or more UL grants of the DL transmission.

Example 26 is an apparatus to be employed by an evolved NodeB ("eNB") configured to perform operations, the operations comprising: means for processing communication signals on at least one of: an unlicensed band or a licensed band; and means for generating a downlink ("DL") transmission with one or more UL grants and one or more indications within a first transmission opportunity that enables scheduling of one or more uplink ("UL") transmissions associated with at least one of a physical UL shared channel ("PUSCH") or a physical UL control channel ("PUCCH"); wherein the one or more indications comprise an indication of whether to schedule the one or more UL transmissions within the first transmission opportunity or a second transmission opportunity that is outside of the first transmission opportunity.

Example 27 includes the subject matter of Example 26, including or omitting optional elements, wherein the operations further comprise: means for generating the DL transmission with the one or more indications comprising another indication of a subframe range or a timing relationship between the one or more UL grants and the one or more UL transmissions that enables a scheduling of subframes corresponding to the one or more UL transmissions within the second transmission opportunity based on the subframe range or the timing relationship; means for generating the DL transmission with a listen before talk ("LBT") indication of whether to perform a category 4 LBT protocol or a clear channel assessment with a single LBT interval that is shorter than the category 4 LBT protocol, on the unlicensed band or the licensed band; and means for generating, via an L1 signal of an L1 interface, a further indication of whether to utilize a reservation signal to reserve the unlicensed band or the licensed band in response to completing the category 4 LBT protocol before a scheduled subframe boundary and the one or more UL transmissions being scheduled within the second transmission opportunity that is outside of the first transmission opportunity.

Example 28 includes the subject matter of any one of Examples 26-28, including or omitting optional elements, wherein the operations further comprise: means for generating the one or more UL grants corresponding to different UEs and trigger the different UEs to perform a category 4 LBT protocol before transmitting the one or more UL transmissions based on the one or more UL grants; and means for generating an other indication of an offset to enable a timing relationship associated with the one or more UL grants in scheduling subframes corresponding to the one or more UL transmissions from the different UEs within the second transmission opportunity.

Example 29 is an apparatus to be employed by a user equipment ("UE") configured to perform operations, the operations comprising: means for generate communication signals on at least one of: an unlicensed band or a licensed band; and means for scheduling one or more uplink ("UL") transmissions associated with at least one of a physical UL shared channel ("PUSCH") or a physical UL control channel ("PUCCH") based on a downlink ("DL") transmission with one or more UL grants and one or more indications within a first transmission opportunity; wherein the one or more indications comprise an indication of whether to schedule the one or more UL transmissions within the first transmission opportunity or a second transmission opportunity that is outside of the first transmission opportunity.

Example 30 includes the subject matter of Example 29, including or omitting optional elements, wherein the operations further comprise: means for performing a category 4 listen before talk ("LBT") protocol in response to the one or more indications of the DL transmission indicating to schedule the one or more UL transmissions within the second transmission opportunity; and means for performing a clear channel assessment that is shorter than the category 4 LBT protocol in response to the one or more indications indicating to schedule the one or more UL transmissions within the first transmission opportunity, on the unlicensed band or the licensed band, or in response to completing the category 4 LBT before a subframe boundary for the one or more UL transmissions on the second transmission opportunity and utilizing a self-deference interval; wherein the performing the clear channel assessment is performed at a first symbol before communicating the one or more UL transmissions after a second symbol of a subframe, in response to performing the category 4 LBT protocol with the self-deference interval.

Example 31 includes the subject matter of any one of Examples 29-30, including or omitting optional elements, wherein the operations further comprise: means for scheduling the one or more UL transmissions within the second transmission opportunity based on the indication and an offset indication corresponding to different UEs being scheduled by the one or more UL grants of the DL transmission; wherein the one or more UL grants indicate a scheduling of the one or more UL transmissions on a different component carrier than a component carrier of the DL transmission or another UE corresponding to the one or more UL grants of the DL transmission.

Example 32 is a system of an evolved NodeB ("eNB") comprising: one or more processors configured to execute executable instructions stored in a memory for one or more executable components comprising: a communication component configured to process communication signals on an unlicensed band or a licensed band; and a scheduling component configured to generate a downlink ("DL") transmission with one or more uplink ("UL") grants and one or more indications within a first transmission opportunity, wherein the one or more indications enable scheduling one or more UL transmissions associated with a physical UL shared channel ("PUSCH") or a physical UL control channel ("PUCCH") and indicate whether to schedule the one or more UL transmissions within the first transmission opportunity or a second transmission opportunity that is outside of the first transmission opportunity.

Example 33 includes the subject matter of Example 32, including or omitting optional elements, wherein the scheduling component is further configured to generate the DL transmission with the one or more indications comprising a subframe range or a timing relationship between the one or more UL grants and the one or more UL transmissions to enable a scheduling of subframes corresponding to the one or more UL transmissions within the second transmission opportunity.

Example 34 includes the subject matter of any one of Examples 32-33, including or omitting optional elements, wherein the scheduling component is further configured to generate the DL transmission with a listen before talk ("LBT") indication of whether to perform a category 4 LBT protocol or a clear channel assessment with a single LBT interval that is shorter than the category 4 LBT protocol, on the unlicensed band or the licensed band.

Example 35 includes the subject matter of any one of Examples 32-34, including or omitting optional elements, wherein the communication component is further configured to generate, via an L1 signal of an L1 interface, another indication of whether to utilize a reservation signal to reserve the unlicensed band or the licensed band in response to completing the category 4 LBT protocol before a scheduled subframe boundary and the one or more UL transmissions being scheduled within the second transmission opportunity.

Example 36 includes the subject matter of any one of Examples 32-35, including or omitting optional elements, wherein the scheduling component is further configured to generate the one or more UL grants as corresponding to different UEs and trigger the different UEs to perform a category 4 LBT protocol before transmitting the one or more UL transmissions based on the one or more UL grants.

Example 37 includes the subject matter of any one of Examples 32-36, including or omitting optional elements, wherein the scheduling component is further configured to generate the one or more indications to indicate one or more offsets of the different UEs that enable a timing relationship in a scheduling of subframes between the one or more UL grants and the one or more UL transmissions from the different UEs within the second transmission opportunity.

Example 38 includes the subject matter of any one of Examples 32-37, including or omitting optional elements, wherein the scheduling component is further configured to determine a start of the one or more UL transmissions of the PUSCH based on a blind detection in response to the one or more UL grants being associated with a single UE, or based on a plurality of start indications provided by different UEs in response to the one or more UL grants within the first transmission opportunity being associated with the different UEs in the second transmission opportunity.

Example 39 includes the subject matter of any one of Examples 32-38, including or omitting optional elements, wherein the scheduling component is further configured to generate the one or more UL grants with the one or more indications indicating a scheduling of the one or more UL transmissions on a first component carrier that is different from a component carrier of the DL transmission.

Example 40 includes the subject matter of any one of Examples 32-39, including or omitting optional elements, wherein the scheduling component is further configured to generate the one or more UL grants with the one or more indications indicating a scheduling of the one or more UL transmissions on different component carriers associated with different UEs, respectively.

Example 41 includes the subject matter of any one of Examples 32-39, including or omitting optional elements, wherein the scheduling component is located at or included as part of a media access control (MAC) layer or a physical (PHY) layer of an OCI protocol.

Example 42 is a system of a user equipment ("UE") comprising: one or more processors configured to execute executable instructions stored in a memory for one or more executable components comprising: a communication component configured to communication signals on at least one of: an unlicensed band or a licensed band; and a scheduling component configured to process a downlink ("DL") transmission comprising one or more UL grants and one or more indications within a first transmission opportunity that enables scheduling one or more uplink ("UL") transmissions associated with a physical UL shared channel ("PUSCH") or a physical UL control channel ("PUCCH"), wherein the one or more indications comprise an indication of whether to schedule the one or more UL transmissions within the first transmission opportunity or a second transmission opportunity that is different than the first transmission opportunity.

Example 43 includes the subject matter of Example 42, including or omitting optional elements, wherein the scheduling component is further configured to process the DL transmission from a physical downlink control channel ("PDCCH") transmission with the one or more UL grants to obtain the indication of whether to schedule the one or more UL transmissions within the first transmission opportunity or the second transmission opportunity and schedule the one or more UL transmissions of the PUSCH or PUCCH within the second transmission opportunity based on the one or more indications of the DL transmission.

Example 44 includes the subject matter of any one of Examples 42-43, including or omitting optional elements, wherein the scheduling component is located at or included as part of a media access control (MAC) layer or a physical (PHY) layer of an OCI protocol.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDML, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a user equipment ("UE") comprising:
   memory to store executable instructions; and
   one or more processors coupled with the memory to execute the executable instructions for one or more executable components comprising:
      a communication component to transmit or receive signals on at least one of: an unlicensed band or a licensed band;
      a scheduling component to process a downlink ("DL") transmission that includes one or more UL grants and one or more indications within a first transmission opportunity that enables scheduling one or more uplink ("UL") transmissions associated with a physical UL shared channel ("PUSCH") or a physical UL control channel ("PUCCH"), wherein the one or more indications include an indication to schedule the one or more UL transmissions within a second transmission opportunity that is different than the first transmission opportunity; and
      a listen before talk ("LBT") component to:
         perform a category 4 LBT protocol with a self-deference interval in response to the indication to schedule the one or more UL transmissions within the second transmission opportunity, wherein to perform the category 4 LBT protocol with the self-deference interval, the LBT component is further to: perform the self-deference interval in response to the category 4 LBT protocol being completed before a boundary of a subframe in which at least one of the one or more UL transmissions are to be scheduled; and perform a clear channel assessment after the self-deference interval and before transmission of the one or more UL transmissions; and
         transmit the one or more UL transmissions after a second symbol of the subframe based on a completion time of the category 4 LBT protocol with the self-deference interval.

2. The apparatus of claim 1, wherein the scheduling component is further to process the DL transmission from a physical downlink control channel ("PDCCH") transmission with the one or more UL grants to obtain the indication to schedule the one or more UL transmissions within the second transmission opportunity and schedule the one or more UL transmissions of the PUSCH or PUCCH within the second transmission opportunity based on the one or more indications of the DL transmission.

3. The apparatus of claim 1, wherein the scheduling component is further to schedule the one or more UL transmissions based on another indication from the one or more UL grants of a subframe range or of which particular subframes of a plurality of subframes to schedule the one or more UL transmissions within the second transmission opportunity.

4. The apparatus of claim 1, wherein the LBT component is further to switch between performing the category 4 LBT protocol and the clear channel assessment based on at least one of: the indication, another indication of whether the one or more UL grants schedule the one or more UL transmissions for different UEs or a single UE, a further indication of whether a reservation signal is enabled, or whether the category 4 LBT protocol is completed successfully with a self-deference interval.

5. The apparatus of claim 1, wherein the LBT component is further to generate the category 4 LBT protocol based on one or more parameters related to a priority class associated with a scheduled traffic flow and communicated via L1 or L2 signaling.

6. The apparatus of claim 1, wherein the scheduling component is further to schedule the one or more UL transmissions within the second transmission opportunity based on an offset indication associated with different UEs being scheduled by the one or more UL grants of the DL transmission.

7. The apparatus of claim 1, wherein the one or more UL grants indicate a scheduling of the one or more UL transmissions on a different component carrier than a component carrier of the DL transmission or another UE corresponding to the one or more UL grants of the DL transmission.

8. A non-transitory computer-readable medium storing executable instructions that, in response to execution, cause one or more processors of a user equipment ("UE") to perform operations, comprising:
generating communication signals on at least one of: an unlicensed band or a licensed band;
scheduling one or more uplink ("UL") transmissions associated with at least one of a physical UL shared channel ("PUSCH") or a physical UL control channel ("PUCCH") based on a downlink ("DL") transmission with one or more UL grants and one or more indications within a first transmission opportunity, wherein the one or more indications includes an indication to schedule the one or more UL transmissions within a second transmission opportunity that is outside of the first transmission opportunity;
performing a category 4 listen before talk ("LBT") protocol with a self-deference interval in response to the indication to schedule the one or more UL transmissions within the second transmission opportunity,
wherein performing the category 4 LBT protocol with self-deference interval includes:
performing a clear channel assessment that is shorter than the category 4 LBT protocol in response to completing the category 4 LBT before a subframe boundary for the one or more UL transmissions on the second transmission opportunity and utilizing the self-deference interval;
wherein the performing the clear channel assessment is performed at a first symbol before transmitting the one or more UL transmissions after a second symbol of a subframe, in response to performing the category 4 LBT protocol with the self-deference interval.

9. The non-transitory computer-readable medium of claim 8, wherein the operations further comprise:
scheduling the one or more UL transmissions within the second transmission opportunity based on the indication and an offset indication corresponding to different UEs being scheduled by the one or more UL grants of the DL transmission;
wherein the one or more UL grants indicate a scheduling of the one or more UL transmissions on a different component carrier than a component carrier of the DL transmission or another UE corresponding to the one or more UL grants of the DL transmission.

* * * * *